(12) United States Patent
Shiomi et al.

(10) Patent No.: US 9,128,298 B2
(45) Date of Patent: Sep. 8, 2015

(54) THREE-DIMENSIONAL IMAGE DISPLAY APPARATUS, DISPLAY SYSTEM, DRIVING METHOD, DRIVING APPARATUS, DISPLAY CONTROLLING METHOD, DISPLAY CONTROLLING APPARATUS, PROGRAM, AND COMPUTER-READABLE RECORDING MEDIUM

(75) Inventors: Makoto Shiomi, Osaka (JP); Tatsunori Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 301 days.

(21) Appl. No.: 13/639,457

(22) PCT Filed: Feb. 4, 2011

(86) PCT No.: PCT/JP2011/052319
§ 371 (c)(1),
(2), (4) Date: Oct. 4, 2012

(87) PCT Pub. No.: WO2011/125368
PCT Pub. Date: Oct. 13, 2011

(65) Prior Publication Data
US 2013/0033588 A1 Feb. 7, 2013

(30) Foreign Application Priority Data
Apr. 5, 2010 (JP) ................................ 2010-087050

(51) Int. Cl.
*H04N 13/02* (2006.01)
*G02B 27/26* (2006.01)
(Continued)

(52) U.S. Cl.
CPC .............. *G02B 27/26* (2013.01); *G03B 35/26* (2013.01); *G09G 3/003* (2013.01); *G09G 3/20* (2013.01);
(Continued)

(58) Field of Classification Search
CPC .............. G02B 27/26; H04N 21/4318; H04N 13/0438; H04N 13/0497; H04N 13/0434; H04N 21/42607; H04N 21/4307; H04N 21/816; H04N 21/8193; H04N 5/44; H04N 5/72; H04N 13/0402; H04N 13/0429; H04N 13/0232; H04N 13/0431; G09G 3/003; G09G 3/20; G03B 35/26
USPC .......................................................... 348/58
See application file for complete search history.

(56) References Cited

U.S. PATENT DOCUMENTS 5,930,037 A * 7/1999 Imai .............................. 359/463
6,049,424 A * 4/2000 Hamagishi .................... 359/464
(Continued)

FOREIGN PATENT DOCUMENTS

| CN | 101094424 | 12/2007 |
| CN | 102511167 | 6/2012 |

(Continued)

OTHER PUBLICATIONS

International Search Report for PCT/JP2011/052319 mailed.

*Primary Examiner* — Shan Elahi
(74) *Attorney, Agent, or Firm* — Nixon & Vanderhye P.C.

(57) ABSTRACT

A three-dimensional image display apparatus polarizes light to be emitted from a first pixels into light having a first polarization characteristic and polarizes light to be emitted from second pixels into light having a second polarization characteristic. The three-dimensional image display apparatus, sets luminance of at least one of luminance of a left-eye image or luminance of a right-eye image such that the luminance of a predefined first image of the left-eye image or the right-eye image is higher than the luminance of a second image of the images. The three-dimensional image display apparatus causes the first pixels to render the first image at the set luminance on a screen and causes the second pixels to render the second image at the set luminance on the screen.

7 Claims, 28 Drawing Sheets

(51) Int. Cl.

| | | |
|---|---|---|
| *G03B 35/26* | (2006.01) | |
| *G09G 3/00* | (2006.01) | |
| *G09G 3/20* | (2006.01) | |
| *H04N 13/04* | (2006.01) | |
| *H04N 5/44* | (2011.01) | |
| *H04N 5/72* | (2006.01) | |
| *H04N 21/426* | (2011.01) | |
| *H04N 21/43* | (2011.01) | |
| *H04N 21/81* | (2011.01) | |
| *H04N 21/431* | (2011.01) | |
| *H04N 21/4402* | (2011.01) | |

(52) U.S. Cl.
CPC . *H04N 5/44* (2013.01); *H04N 5/72* (2013.01); *H04N 13/0434* (2013.01); *H04N 13/0438* (2013.01); *H04N 13/0497* (2013.01); *H04N 21/42607* (2013.01); *H04N 21/4307* (2013.01); *H04N 21/4318* (2013.01); *H04N 21/816* (2013.01); *H04N 21/8193* (2013.01); *G09G 3/2074* (2013.01); *G09G 2320/0276* (2013.01); *G09G 2320/0626* (2013.01); *G09G 2354/00* (2013.01); *G09G 2360/16* (2013.01); *H04N 21/440263* (2013.01); *H04N 2213/008* (2013.01)

(56) References Cited

U.S. PATENT DOCUMENTS

| | | | | |
|---|---|---|---|---|
| 6,271,808 | B1 * | 8/2001 | Corbin | 345/7 |
| 6,600,461 | B1 | 7/2003 | Okauchi et al. | |
| 7,719,552 | B2 * | 5/2010 | Karman | 345/698 |
| 8,206,218 | B2 * | 6/2012 | Gutierrez Novelo | 463/30 |
| 8,487,917 | B2 * | 7/2013 | Han et al. | 345/204 |
| 2004/0057612 | A1 * | 3/2004 | Tabata | 382/154 |
| 2005/0146787 | A1 * | 7/2005 | Lukyanitsa | 359/462 |
| 2006/0087621 | A1 * | 4/2006 | McDowall et al. | 353/31 |
| 2006/0087653 | A1 * | 4/2006 | Matsumoto et al. | 356/369 |
| 2007/0134442 | A1 | 6/2007 | Matsunaga et al. | |
| 2007/0242068 | A1 * | 10/2007 | Han et al. | 345/427 |
| 2008/0013001 | A1 * | 1/2008 | Jang et al. | 349/15 |
| 2008/0117233 | A1 * | 5/2008 | Mather et al. | 345/690 |
| 2010/0007716 | A1 * | 1/2010 | Lee et al. | 348/43 |
| 2010/0151944 | A1 * | 6/2010 | Novelo | 463/32 |
| 2010/0182602 | A1 * | 7/2010 | Urano et al. | 356/369 |
| 2011/0001807 | A1 | 1/2011 | Myokan | |
| 2011/0012991 | A1 * | 1/2011 | Watanabe et al. | 348/43 |
| 2011/0032252 | A1 * | 2/2011 | Ohta | 345/419 |
| 2011/0063298 | A1 * | 3/2011 | Hulyalkar et al. | 345/427 |
| 2011/0164188 | A1 * | 7/2011 | Karaoguz et al. | 348/734 |
| 2011/0211256 | A1 * | 9/2011 | Connor | 359/463 |
| 2012/0015579 | A1 * | 1/2012 | Cho | 445/24 |
| 2012/0086777 | A1 * | 4/2012 | Chen et al. | 348/46 |
| 2012/0194660 | A1 | 8/2012 | Nakamura et al. | |

FOREIGN PATENT DOCUMENTS

| | | |
|---|---|---|
| JP | 8-111833 | 4/1996 |
| JP | 10-224822 | 8/1998 |
| JP | 2002-199416 | 7/2002 |
| JP | 2004-235942 | 8/2004 |
| JP | 2006-129225 | 5/2006 |
| JP | 2008-292577 | 12/2008 |
| JP | 2010-81001 | 4/2010 |
| JP | 2011-15177 | 1/2011 |
| WO | WO 2005/096041 | 10/2005 |

* cited by examiner

FIG.27
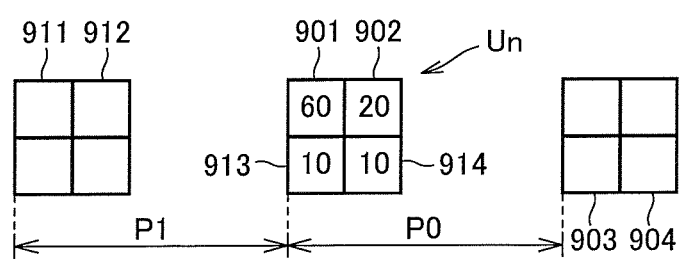
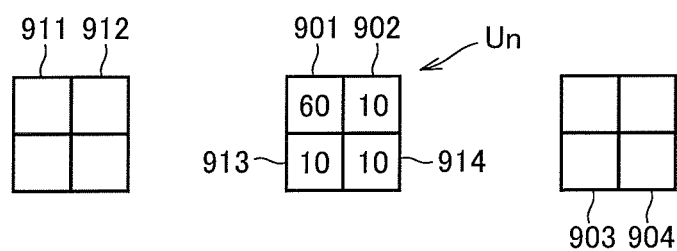
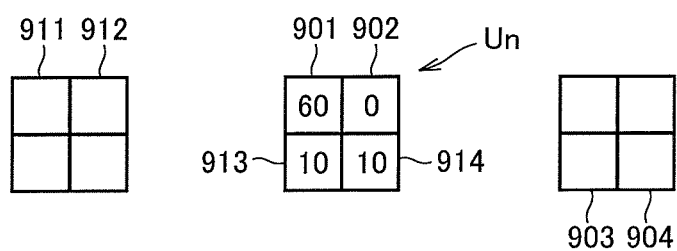

FIG.28
(a)
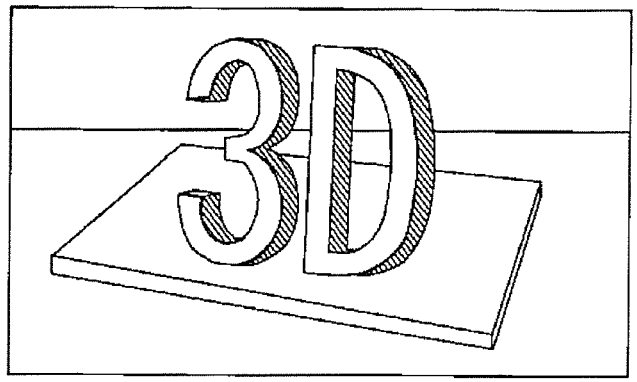
(b)
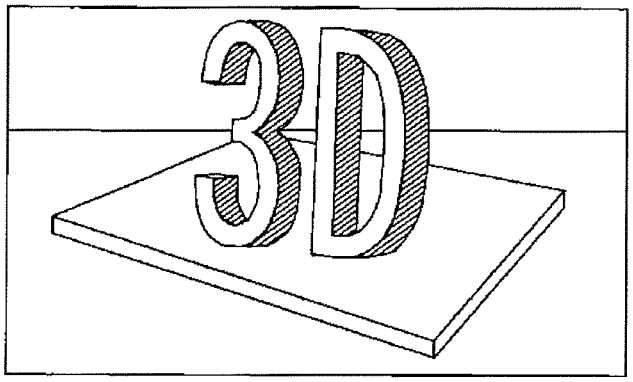
(c)
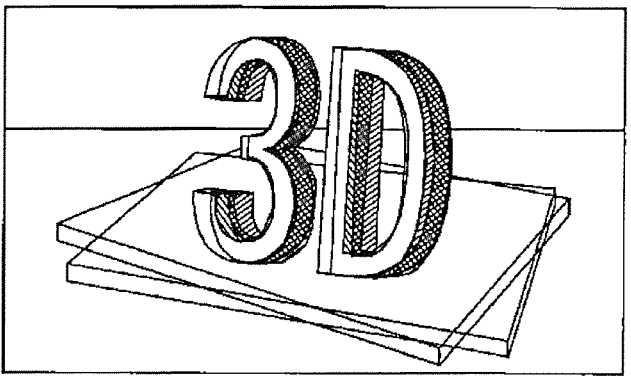

THREE-DIMENSIONAL IMAGE DISPLAY APPARATUS, DISPLAY SYSTEM, DRIVING METHOD, DRIVING APPARATUS, DISPLAY CONTROLLING METHOD, DISPLAY CONTROLLING APPARATUS, PROGRAM, AND COMPUTER-READABLE RECORDING MEDIUM

This application is the U.S. national phase of International Application No. PCT/JP2011/052319 filed 4 Feb. 2011 which designated the U.S. and claims priority to JP 2010-087050 filed 5 Apr. 2010, the entire contents of each of which are hereby incorporated by reference.

TECHNICAL FIELD

The present invention relates to a three-dimensional image display apparatus, a display system, a driving method, a driving apparatus, a display controlling method, a display controlling apparatus, a program, and a computer-readable recording medium. More specifically, the invention relates to a three-dimensional image display apparatus, a driving method, a driving apparatus, a display controlling method, a display controlling apparatus, a program, and a computer-readable recording medium that allow viewers to visually recognize three-dimensional images in combination with an optical aid, and to a display system including the three-dimensional image display apparatus and the optical aid.

BACKGROUND ART

Active research and development are recently in progress for practical realization of a three-dimensional display system allowing for visual recognition of three-dimensional images for viewers.

Three-dimensional image display systems have been roughly classified into (1) so-called 3-D glasses type three-dimensional image display systems and (2) naked eye three-dimensional image display systems, where according to the system (1) an image display apparatus displays images including left-eye images and right-eye images with disparity added thereto, and viewers wear special kind of glasses (an optical aid) that allow left-eye images to be visually recognized by the left eye while allowing right-eye images to be visually recognized by the right eye, and according to the system (2), it is so configured that three-dimensional images are visually recognizable without the use of special glasses.

The 3-D glasses type three-dimensional image display systems (1) are further classified into several kinds of systems. The following systems are examples thereof: (a) a so-called anaglyph system in which left-eye images and right-eye images are created in two different colors, e.g., red and blue, the system involving use of glasses including a red color filter for one eye and blue color filter for the other eye (refer to, for example, Japanese Patent Laying-Open No. 2006-129225 (PTL 1)); and (b) a system in which left-eye images and right-eye images are displayed in differently polarized conditions, the system involving use of glasses provided with polarization filters for separating left-hand and right-hand images (refer to, for example, paragraphs [0038] to [0054] of Japanese Patent Laying-Open No. 2008-292577 (PTL 2); and (c) a system in which left-eye images and right-eye images are displayed alternately, the system involving use of liquid-crystal shutter glasses for performing opening/closing operation in alternative manner between the right and the left in conjunction with switch of images (refer to, for example, paragraphs [0055] to [0066] of PTL 2).

There are also polarizing devices with patterns provided in a plurality of polarization regions that are different in direction of transmission axis of polarization (refer to, for example, paragraphs [0002] to [0003] of WO 2005/096041A (PTL 3)).

CITATION LIST

Patent Literature

PTL 1: Japanese Patent Laying-Open No. 2006-129225
PTL 2: Japanese Patent Laying-Open No. 2008-292577
PTL 3: WO2005/096041A

SUMMARY OF INVENTION

Technical Problem

However, with the 3-D glasses type three-dimensional image display systems, left-eye images and right-eye images look as if they were overlapped with one another to those who do not wear the special glasses for the systems see the screen. More specifically, when a left-eye image depicted in FIG. 28 (a) and a right-eye image depicted in FIG. 28 (b) are displayed for three-dimensional image display on the image display apparatus, seeing these images without using the special glasses, the left-eye image and the right-eye image are visually recognized as overlapping images with the contours thereof deviating from each other as depicted in FIG. 28(c).

In view of the above circumstances, an object of the present invention is to provide a three-dimensional image display apparatus, which is an image display apparatus involving use of special glasses (an optical aid) to achieve three-dimensional image display, enabling visual recognition of images with less uncomfortable feeling also for those who see the screen without using the optical aid, a display system, a driving method, a driving apparatus, a display controlling method, a display controlling apparatus, a program, and a computer-readable recording medium, and a display system including the image display apparatus.

Solution to Problem

In accordance with one aspect of the present invention, there is provided a three-dimensional image display apparatus, including a plurality of pixels and being configured to display on a screen a left-eye image and a right-eye image constituting one three-dimensional image in one frame period. The pixels belong to any of a plurality of pixel groups. The plurality of pixel groups each include a first pixel and a second pixel as the pixels. The three-dimensional image display apparatus includes: a polarization unit for polarizing light to be emitted from the first pixel into light with a first polarization characteristic and for polarizing light to be emitted from the second pixel into light with a second polarization characteristic; an image processing unit for setting luminance of at least one of luminance of the left-eye image or luminance of the right-eye image, such that the luminance of a predefined first image of the left-eye image or the right-eye image is higher than the luminance of a second image of the images; and a display controlling unit for causing the first pixel to render the first image at the set luminance on the screen and for causing the second pixel to render the second image at the set luminance on the screen.

Preferably, in each of the pixel groups, the second pixel is adjacent to the first pixel. The image processing unit is configured such that when displaying each three-dimensional image, luminance of at least one of the first pixels in all the pixel groups is set to be higher than luminances of all the second pixels in all the pixel groups.

Preferably, luminance of at least one included in the first pixels is adapted to be set higher than luminances of all the second pixels in the pixel group.

Preferably, the first pixel includes a plurality of pixels in each of the pixel groups. The image processing unit is configured to set different luminance values for the plurality of first pixels in each of the pixel groups, and to subtract luminance of the second pixel from the set luminance with respect to pixels other than a pixel with the highest luminance of the plurality of first pixels in the each of the pixel groups.

Preferably, the second pixel is adjacent to the first pixel group in each of the pixel groups. The first pixel is larger in number than the second pixel in each of the pixel groups. The image processing unit includes a luminance allocating unit for allocating luminance to the first pixel and the second pixel in each of the pixel groups. The luminance allocating unit is configured to perform resolution conversion by using a non-linear filter on the first image, to conduct the allocation of luminance to the first pixel.

Preferably, the three-dimensional image display apparatus is a liquid crystal display. The liquid crystal display has a liquid crystal mode of normally black vertical alignment.

Preferably, the liquid crystal mode is a mode of combination of the vertical alignment and alignment division.

Preferably, the image processing unit is configured to set the luminance of the first image to be greater than or equal to double and less than or equal to eight times the luminance of the second image for display of the three-dimensional image.

In accordance with another aspect of the present invention, there is provided a three-dimensional image display apparatus, including a plurality of pixels and being configured to display on a screen a left-eye image and a right-eye image constituting one tree-dimensional image within one frame period based on a video signal to be inputted. The pixels belong to any of a plurality of pixels. The plurality of pixel groups each include a first pixel and a second pixel as the pixels. The three-dimensional image display apparatus includes: a processor; a memory for storing the video signal; and a polarization filter for polarizing light to be emitted from the first pixel into light with a first polarization characteristic and for polarizing light to be emitted from the second pixel into light with a second polarization characteristic. The processor is configured to set luminance of at least one of luminance of the left-eye image or luminance of the right-eye image such that the luminance of a predefined first image of the left-eye image or the right-eye image is higher than the luminance of a second image of the images. The processor is configured to cause the first pixel to render the first image at the set luminance on the screen and to cause the second pixel to render the second pixel to render the second image at the set luminance on the screen.

In accordance with still another aspect of the present invention, there is provided a display system, including: an optical aid for viewing three-dimensional images; a plurality of pixels; and a three-dimensional image display apparatus for displaying on a screen a left-eye image and a right-eye image constituting one three-dimensional image within one frame period. The pixels belong to any of a plurality of pixel groups. The plurality of pixel groups each include a first pixel and a second pixel as the pixels. The three-dimensional image display apparatus includes: a polarization unit for polarizing light to be emitted from the first pixel into light with a first polarization characteristic and for polarizing light to be emitted from the second pixel into light with a second polarization characteristic; an image processing unit for setting luminance of at least one of luminance of the left-eye image or luminance of the right-eye image such that the luminance of a predefined first image of the left-eye image or the right-eye image is higher than the luminance of a second image of the images; and a display controlling unit for causing the first pixel to render the first image at the set luminance on the screen and for causing the second pixel to render the second image at the set luminance on the screen. The optical aid includes: a first light transmission portion for permitting light based on the first image to transmit therethrough and for restricting light based on the second image from transmitting therethrough; and a second light transmission portion for restricting light based on the first image from transmitting therethrough and for permitting light based on the second image to transmit therethrough.

In accordance with yet another aspect of the present invention, there is provided a method of driving a three-dimensional image display apparatus configured to display on a screen a left-eye image and a right-eye image constituting one three-dimensional image within one frame period. The three-dimensional image display apparatus includes a plurality of pixels. The pixels belong to any of a plurality of pixel groups. The plurality of pixel groups each include a first pixel and a second pixel as the pixels. The three-dimensional image display apparatus further includes a polarization unit for polarizing light to be emitted from the first pixel into light with a first polarization characteristic and for polarizing light to be emitted from the second pixel into light with a second polarization characteristic. The driving method includes the steps of: setting, by a processor of the three-dimensional image display apparatus, luminance of at least one of luminance of the left-eye image or luminance of the right-eye image such that the luminance of a predefined first image of the left-eye image or the right-eye image is higher than the luminance of a second image of the images; and causing, by the processor, the first pixel to render the first image at the set luminance on the screen and causing the second pixel to render the second image at the set luminance on the screen.

In accordance with still another aspect of the present invention, there is provided a driving apparatus for driving a three-dimensional image display apparatus for displaying on a screen a left-eye image and a right-eye image constituting one three-dimensional image within one frame period. The three-dimensional image display apparatus includes a plurality of pixels. The pixels belong to any of a plurality of pixel groups. The plurality of pixel groups each include a first pixel and a second pixel as the pixels. The three-dimensional image display apparatus further includes a polarization unit for polarizing light to be emitted from the first pixel into light with a first polarization characteristic and polarizing light to be emitted from the second pixel into light with a second polarization characteristic. The driving apparatus is configured to set luminance of at least one of luminance of the left-eye image or luminance of the right-eye image such that the luminance of a predefined first image of the left-eye image or the right-eye image is higher than the luminance of a second image of the images, and to cause the first pixel to render the first image at the set luminance on the screen and to cause the second pixel to render the second image at the set luminance on the screen.

In accordance with still another aspect of the present invention, there is provided a method of controlling display for use in a three-dimensional image display apparatus including a plurality of pixels and being configured to display on a screen a left-eye image and a right-eye image constituting one three-dimensional image within one frame period. The pixels belong to any of a plurality of pixel groups. The plurality of pixel groups each include a first pixel and a second pixel as the pixels. The method of controlling display includes the steps of: setting, by a processor of the three-dimensional image display apparatus, luminance of at least one of luminance of the left-eye image or luminance of the right-eye image such that the luminance of a predefined first image of the left-eye image or the right-eye image is higher than the luminance of a second image of the images; and causing, by the processor, the first pixel to render the first image at the set luminance on the screen and causing the second pixel to render the second image at the set luminance on the screen.

In accordance with still another aspect of the present invention, there is provided a display controlling apparatus for displaying on a display including a plurality of pixels a left-eye image and a right-eye image constituting one three-dimensional image within one frame period. The pixels belong to any of a plurality of pixel groups. The plurality of pixel groups each include a first pixel and a second pixel as the pixels. The display controlling apparatus includes: an image processing unit for setting luminance of at least one of luminance of the left-eye image or luminance of the right-eye image such that the luminance of a predefined first image of the left-eye image or the right-eye image is higher than the luminance of a second image of the images; and a display controlling unit for causing the first pixel to render the first image at the set luminance on the screen and for causing the second pixel to render the second image at the set luminance on the screen.

In accordance with still another aspect of the present invention, there is provided a program for controlling a three-dimensional image display apparatus including a plurality of pixels and being configured to display on a screen a left-eye image and a right-eye image constituting one three-dimensional image within one frame period. The pixels belong to any of a plurality of pixel groups. The plurality of pixel groups each include a first pixel and a second pixel as the pixels. The program causes the three-dimensional image display apparatus to execute the steps of: setting luminance of at least one of luminance of the left-eye image or luminance of the right-eye image such that the luminance of a predefined first image of the left-eye image or the right-eye image is higher than the luminance of a second image of the images; and causing the first pixel to render the first image at the set luminance on the screen and causing the second pixel to render the second image at the set luminance on the screen.

In accordance with still another aspect of the present invention, there is provided a computer-readable recording medium storing a program for controlling a three-dimensional image display apparatus including a plurality of pixels and being configured to display on a screen a left-eye image and a right-eye image constituting one three-dimensional image within one frame period. The pixels belong to any of a plurality of pixel groups. The plurality of pixel groups each include a first pixel and a second pixel as the pixels. The program causes the three-dimensional image display apparatus to execute the steps of: setting luminance of at least one of luminance of the left-eye image or luminance of the right-eye image such that the luminance of a predefined first image of the left-eye image or the right-eye image is higher than the luminance of a second image of the images; and causing the first pixel to render the first image at the set luminance on the screen and causing the second pixel to render the second image at the set luminance on the screen.

Advantageous Effects of Invention

Visual recognition of images is achieved with less uncomfortable feeling for those who see the screen without using an optical aid.

BRIEF DESCRIPTION OF DRAWINGS

FIG. 27 is an explanatory diagram of an example of processing of a crosstalk correcting unit.

FIG. 28 depicts a left-eye image, a right-eye image, and a condition in which these images are seen with naked eyes.

DESCRIPTION OF EMBODIMENTS

Figure 1:
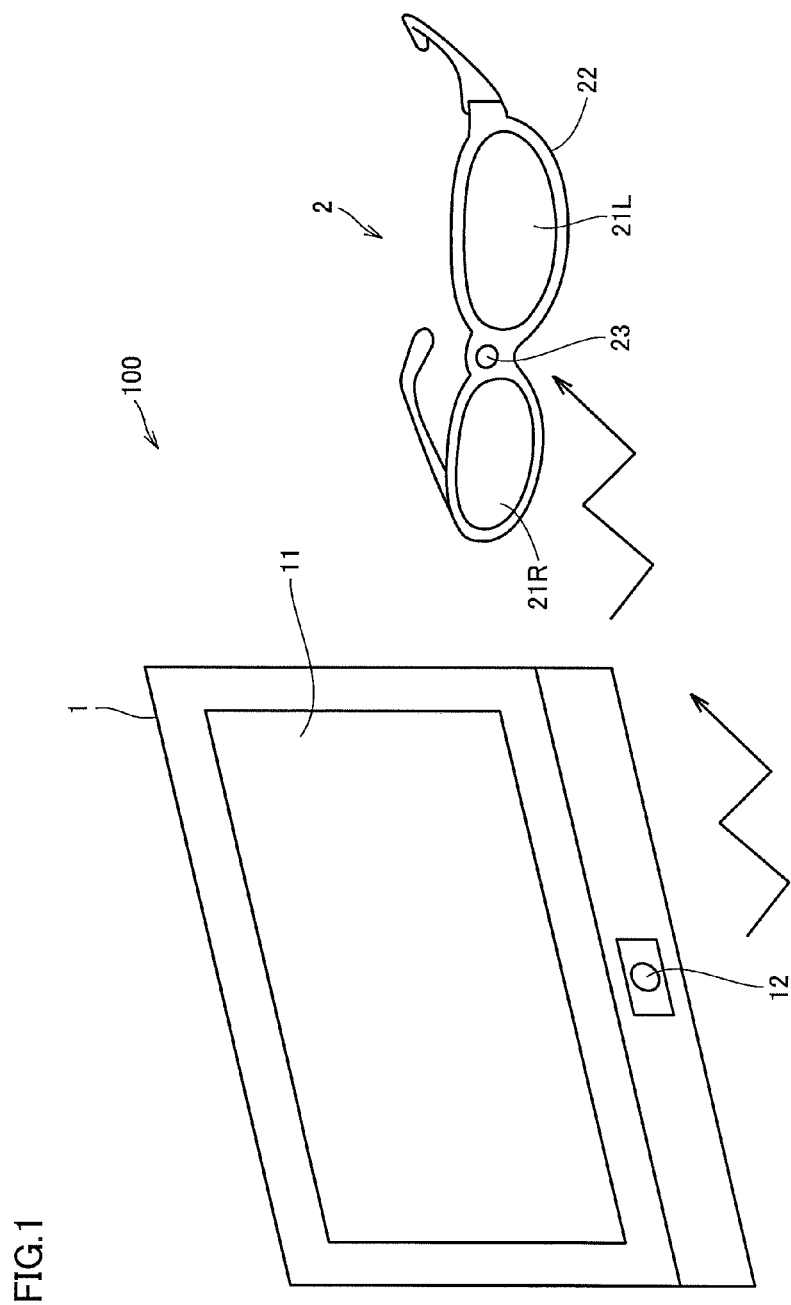
FIG. 1 is an outline diagram depicting the overall configuration of a three-dimensional image display system according to one embodiment of the present invention.

An image display apparatus and a three-dimensional image display system according to embodiments of the present invention are described below with reference to the drawings. In the following description, like components are given like reference numerals. The names and functions thereof are also the same. Hence, detailed description thereof is not given repeatedly.

To facilitate the description, in the drawings to be referenced hereinafter, the configurations are simplified or schematically depicted, or a portion of constituent members are not shown in some cases. Further, the dimensional ratio between the constituent members in the figures not necessarily reflects the actual dimensional ratio.

First Embodiment

An embodiment of the present invention is described with reference to FIGS. 1 to 9. The schematic configuration of a three-dimensional image display system is first described with reference to FIGS. 1 to 6. The detailed configuration of the three-dimensional image display system is described next with reference to FIGS. 7 to 9.

<1. Schematic Configuration of Three-dimensional Image Display System>

FIG. 1 is an outline diagram depicting the overall configuration of a three-dimensional image display system 100. With reference to FIG. 1, three-dimensional image display system 100 has an image display apparatus 1 and shutter glasses 2.

In the present embodiment, a liquid crystal display is used as image display apparatus 1. Image display apparatus 1 is however not limited to a liquid crystal display and may be any self-luminous display or non-self luminous display. Exemplary self-luminous displays include, but not limited to, a cathode-ray tube, a plasma display, an organic electroluminescence, an inorganic electroluminescence, and a field emission display. Exemplary non-self-luminous displays include, but not limited to, a rear projection in addition to the liquid crystal display. Image display apparatus 1 may also be a projector. The same holds true for image display apparatuses according to second to fifth embodiments to be described later.

Image display apparatus 1 includes a display unit 11 for displaying images and a shutter controlling unit 12 for transmitting shutter control signals to shutter glasses 2. Display unit 11 is configured by a liquid crystal panel and is adapted to display images based on display data sent from a video processing unit 13 to be described later.

In shutter glasses 2, liquid crystal shutters 21L and 21R are fitted in the left-eye portion and the right-eye portion of a frame 22, respectively. Shutter glasses 2 also include a control signal receiving unit 23 on frame 22. Shutter glasses 2 depicted in FIG. 1 have the shape of glasses to be worn on the nose to ears; however, the modes of the optical aid are not limited thereto and may be modified in various ways. For example, the glasses may take any shape such as a goggle shape, a head mount shape, or a binocular shape. Further, in the example of FIG. 1, control signal receiving unit 23 is provided on the bridge portion of the frame. Control signal receiving unit 23 may however be provided at any portions of shutter glasses 2 as long as shutter control signals to be sent from shutter controlling unit 12 of image display apparatus 1 are receivable thereat.

Figure 2:
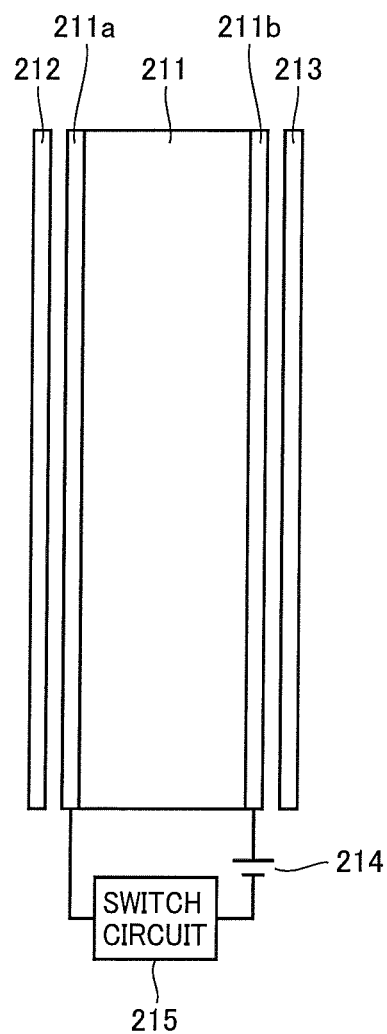
FIG. 2 is a cross-sectional outline diagram depicting a schematic configuration of a liquid crystal shutter of shutter glasses.

FIG. 2 is a cross-sectional outline diagram depicting a schematic configuration of liquid crystal shutters 21L and 21R of shutter glasses 2. It is to be noted that FIG. 2 does not represent the accurate dimensional ratio of the members. With reference to FIG. 2, liquid crystal shutters 21L and 21R of shutter glasses 2 have, respectively, liquid crystal cells 211 and polarizing plates 212 and 213 that are provided on the front and rear side of liquid crystal cells 211. Liquid crystal cells 211 have such a structure that liquid crystal is sealed in between a pair of electrode substrates 211a and 211b. A power source (a battery) 214 for applying voltage between electrode substrates 211a and 211b is, for example, built in frame 22 of shutter glasses 2. A switching circuit 215 is provided to switch on and off the voltage application from power source 214 to electrode substrates 211a and 211b. Polarizing plates 212 and 213 are linear polarizing plates and are, for example, arranged such that the polarizing axes thereof are parallel to each other.

Herein, an example in which TN (Twisted Nematic) liquid crystal is used in liquid crystal cells 211; however, the liquid crystal mode of liquid crystal cells 211 is not limited thereto and may adopt any liquid crystal mode. For example, when the switch of switching circuit 215 is open and voltage is not applied to liquid crystal cells 211, the linearly polarized light that has transmitted through polarizing plate 212 on the front side (the side on which light from image display apparatus 1 is incident) transmits through liquid crystal cells 211 while rotating along the twisted alignment of liquid crystal molecules in liquid crystal cells 211. Hence, in this case, the light that has transmitted through liquid crystal cells 211 does not transmit through polarizing plate 213. Thus, when voltage is not applied to liquid crystal cells 211, liquid crystal shutters 21L and 21R act to shield light from image display apparatus 1.

Meanwhile, upon application of voltage to liquid crystal cells 211 with the switch of switching circuit 215 closed, the liquid crystal molecules in liquid crystal cells 211 exhibits such a behavior that the major axes of the molecules are aligned in the perpendicular direction of the substrate surface of liquid crystal cells 211. Thus, the light that has transmitted through liquid crystal cells 211 passes not being influenced by the liquid crystal molecules in liquid crystal cells 211 to transmit through polarizing plate 213. Hence, when voltage is applied to liquid crystal cells 211, liquid crystal shutters 21L and 21R act to let the light from image display apparatus 1 to pass therethrough.

Shutter glasses 2 control the switch of switching circuit 215 to open and close according to shutter control signals transmitted from shutter controlling unit 12 of image display apparatus 1, such that application of voltage to liquid crystal cells 211 included in liquid crystal shutters 21L and 21R is controlled on and off independently, so as to cause liquid crystal shutters 21L and 21R to perform opening/closing operation independently of each other against the light from the image display apparatus. Hence, in the example described here, liquid crystal shutters 21L and 21R turn into a state of shielding (restricting transmission of) light from image display apparatus 1, i.e., in a state where the shutters are closed by switching off the application of voltage to liquid crystal cells 211. Liquid crystal shutters 21L and 21R turn into a state of letting the light from image display apparatus 1 to pass therethrough, i.e., a state where the shutters are open, by switching on the application of voltage.

An arrangement in which the polarizing axes of polarizing plates 212 and 213 are aligned parallel to each other is exemplarily described here; however, polarizing plates 212 and 213 may be arranged such that the polarizing axes thereof are orthogonal to each other. In this case, a relation inverse to the above description is seen with respect to the relationship between switching on/off of voltage application to liquid crystal cells 211 and light transmission/shielding effects of liquid crystal shutters 21L and 21R. Although the configuration of the present invention is not affected whichever relationship is set, it is preferred that the arrangement is such that the polarizing axes are orthogonal (perpendicular) to each other. More specifically, power is dispensed with by such a configuration that the shutters are closed with voltage application switched on in the case where the user wears the shutter glasses to view objects other than image display apparatus 1. Thus, the shutter glasses herein are ecologically friendly glasses.

Any communication method may be used between shutter controlling unit 12 of image display apparatus 1 and control signal receiving unit 23 of shutter glasses 2. FIG. 1 exemplifies a mode in which radio communication is performed between shutter controlling unit 12 and control signal receiving unit 23, but the communication may be performed by means of a cable. In the case of adopting radio communication, any form of radio communication may be used, including infrared communication and the communication according to Bluetooth (registered trademark).

In the present embodiment, left-eye images and right-eye images are displayed in a temporally alternating manner on display unit 11 of image display apparatus 1. The left-eye image is the image to be visually perceived by the left eye of a viewer assuming that the object to be displayed was seen by the viewer. The right-eye image is the image to be visually perceived by the right eye of a viewer assuming that the object to be displayed was viewed by the viewer. In other words, the left-eye image and the right-eye image have disparity therebetween, such that a sense of depth as if a stereoscopically displayed object were viewed with both eyes is obtained by having the left-eye image visually perceived with the left eye and the right-eye image with the right eye.

Shutter controlling unit 12 transmits shutter control signals for controlling opening/closing of liquid crystal shutters 21L and 21R of shutter glasses 2 to the respective timings at which left-eye images and right-eye images are displayed on display unit 11. Shutter control signals cause the opening/closing operation of liquid crystal shutters 21L and 21R to be controlled such that liquid crystal shutter 21R for the right eye is closed while a left-eye image is being displayed on display unit 11 and that liquid crystal shutter 21L for the left eye is closed while a right-eye image is being displayed on display unit 11. The opening/closing operation of liquid crystal shutters 21L and 21R of the present embodiment is described in detail later.

In this manner, left-eye images and right-eye images are displayed on display unit 11 of image display apparatus 1 in temporally alternating manner and the opening/closing operation of liquid crystal shutters 21L and 21R of shutter glasses 2 is controlled to the display timings, such that three-dimensional image display system 100 allows for visual recognition of three-dimensional images by viewers. Specifically, viewers visually perceive left-eye images with their left eyes and right-eye images with their right eyes by opening/closing of liquid crystal shutters 21L and 21R. Switching left-eye images and right-eye images at a high speed to such a degree that, for example, a total of 60 images are displayed within one second causes an afterimage effect of human eyes, so as for viewers to visually recognize an image that gives a stereoscopic feeling as if the display object is seen with both eyes.

It is to be noted that one frame period of the present case indicates a period to be taken for display of the left-eye image and right-eye image to constitute one three-dimensional image. For example, in the case where a total of 60 images are displayed within one second as described above, the left-eye images and the right-eye images are alternately displayed at 16.7 ms intervals, which means that 33.4 ms corresponds to one frame period. In this case, one frame period is constituted by a total of two sub-frame periods of one sub-frame to display the left-eye image and one sub-frame to display the right-eye image. One frame is however not limited to two sub-frames, and at least one of the left-eye image or the right-eye image is contained for a plurality of sub-frames. For example, one frame is constituted by greater than or equal to four sub-frames in some cases.

The sub-frames include black sub-frames that are not used to display either the left-eye image or the right-eye image. Specifically, one frame is constituted by four sub-frames, and image display apparatus 1 repetitively switches the sub-frames in the order of a right-eye sub-frame, a black sub-frame, a left-eye sub-frame, a black sub-frame . . . . Shutter glasses 2 turn off liquid crystal shutter 21R and liquid crystal shutter 21L at the display timing of the black sub-frames. In this manner, crosstalk is preventable with three-dimensional image display system 100 in viewing 3-D images.

Considering that, currently, many of broadcasting motion pictures are constituted by images supposed to be rewritten at 60 Hz and that switch between shutter glasses is observed as flickering in some cases, it is preferred that one frame period is not longer than ⅟₆₀=16.7 msec. For example, image display apparatus 1 may be configured as (i) to (iv) as described below:

(i) Image display apparatus 1 is configured such that 120 images are rendered within one second and that left-eye sub-frames and right-eye sub-frames are rendered alternately. (ii) Image display apparatus 1 is configured such that 240 images are rendered within one second and that rendering is performed in an order as a left-eye sub-frame, a black sub-frame, a right-eye sub-frame, and a black sub-frame . . . . (iii) Image display apparatus 1 is configured such that 240 images are rendered within one second and that rendering is performed in an order as a left-eye sub-frame, a left-eye sub-frame, a right-eye sub-frame, and a right-eye sub-frame . . . . (iv) Image display apparatus 1 is configured such that 240 images are rendered within one second and that, in combination of an X2 frame interpolation technology, which is in wide use as an improvement measure for motion picture response in recent years, rendering is performed in an order as a left-eye sub-frame, a right-eye sub-frame, a left-eye sub-frame, and a right-eye sub-frame . . . .

Image display apparatus 1 may also be configured as follows: First, image display apparatus 1 is configured such that, instead of constituting one frame with four sub-frames, one frame is constituted by two sub-frames (each for 8.3 msec). Then, image display apparatus 1 may set the writing period for the sub-frame to a shorter period, e.g., 6 msec to provide a period for retaining a fixed image in the sub-frame, in displaying the sub-frames in an order as a left-eye sub-frame, a right-eye sub-frame, a left-eye sub-frame, and a right-eye sub-frame . . . .

Regarding which of the above configuration to be selected, decision may be made in consideration of the high-speed rendering performance of image display apparatus 1, the refresh rate of 3-D images inputted, the quality, e.g., crosstalk, flickering, and brightness, desired for 3-D images according to the intended use.

Figure 3:
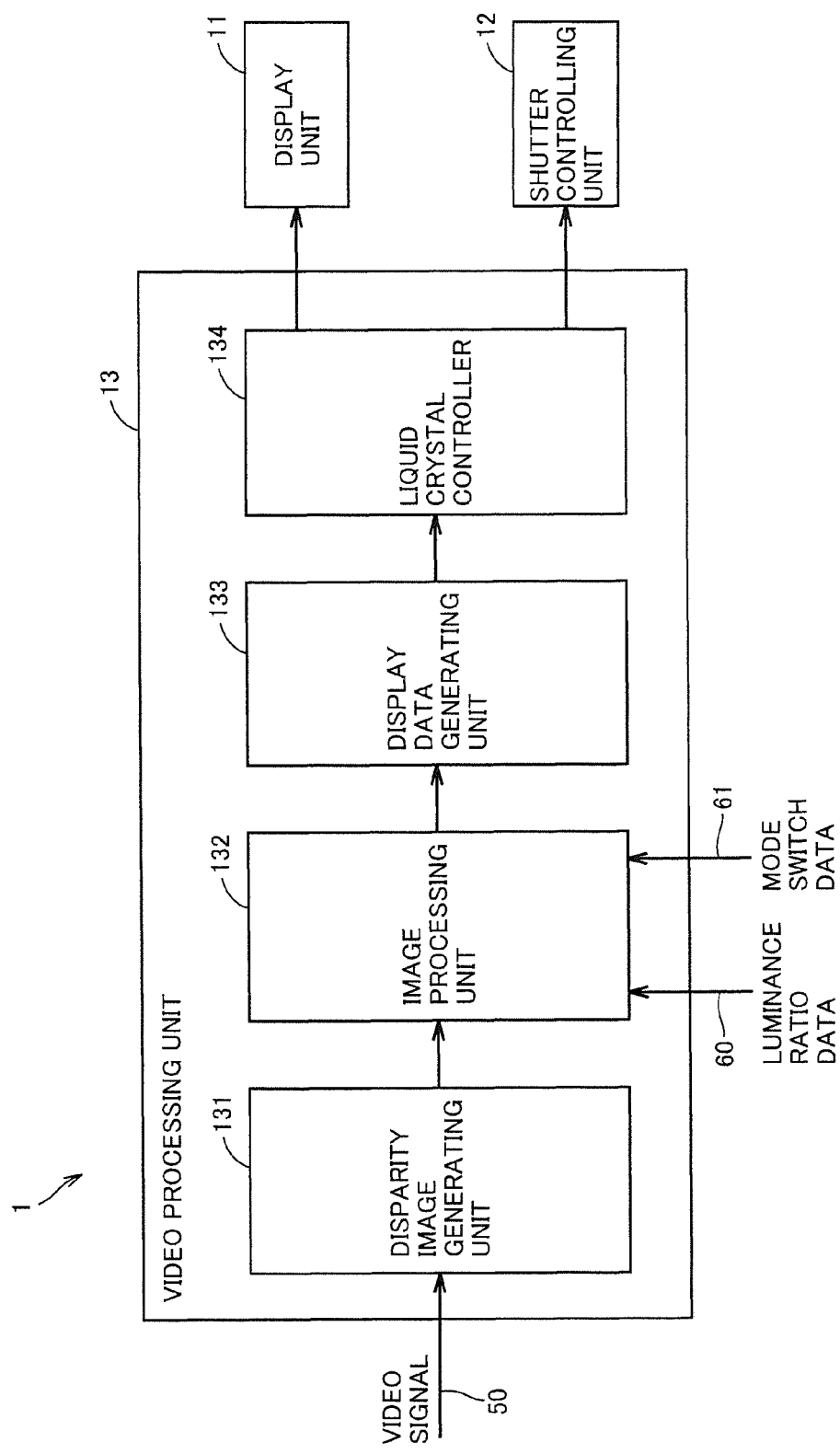
FIG. 3 is a block diagram depicting a functional configuration of an image display apparatus.

FIG. 3 is a block diagram depicting a functional configuration of image display apparatus 1. With reference to FIG. 3, image display apparatus 1 includes video processing unit 13 for implementing the three-dimensional image display function. Image display apparatus 1 also includes display unit 11 and shutter controlling unit 12. Video processing unit 13 includes a disparity image generating unit 131, an image processing unit 132, a display data generating unit 133, and a liquid crystal controller 134.

Disparity image generating unit 131 receives video signals 50 and generates left-eye images and right-eye images based on video signals 50 inputted. The left-eye images and right-eye images thus generated are sent to image processor 132.

Video signals 50 are incoming video signals transmitted from the outside according to a three-dimensional image displaying format. The transmission format is, for example, defined by an interface standard such as HDMI (High-Definition Multimedia Interface). For example, according to HDMI 1.4, the following three kinds of transmission format are defined for video signals 50:

(1) A format for transmitting left-eye images and right-eye images alternately by specific period or specific line;

(2) A format for transmitting a left-eye image and a right-eye image arranged on the horizontally left half and on the horizontally right half, respectively, in an image of one frame; and (3) A format for transmitting two-dimensional video signals with distance information (distance information in the depth direction) added thereto.

Disparity image generating unit 131 extracts left-eye images and right-eye images from video signals 50 according to the transmission format of video signals 50. For example, in the case where video signals 50 are transmitted according to the (1) format, disparity image generating unit 131 sorts left-eye images and right-eye images by frame, line, or field. In the case where video signals 50 are based on the (2) transmission format, disparity image generating unit 131 cuts out the horizontally left half of an image of one frame to define it as a left-eye image and cuts out the horizontally right half to defined it as a right-eye image. In the case where video signals 50 are based on the (3) transmission format, disparity image generating unit 131 generates left-eye images and right-eye images based on the distance information per pixel.

The interface for the video signals 50 is not limited to HDMI and may be any other interface. It may also be so configured that purely two-dimensional video signals are used as video signals 50 and disparity image generating unit 131 assigns distance information appropriately to the pixels according to a predefined algorithm, such that left-eye images and right-eye images are generated from video signals 50.

It is preferred that disparity image generating unit 131 has a configuration to convert the resolution and/or aspect ratio of the right-eye image and the left-eye image appropriately according to image processing unit 132, because such a configuration allows for absorption of difference in transmission format of input images, thus facilitating the subsequent processing.

Image processing unit 132 generates left-eye image display data and right-eye image display data based on left-eye images and right-eye images passed on by disparity image generating unit 131, luminance ratio data 60, and mode switch data 61. Image processing unit 132 passes the left-eye image display data and right-eye image display data thus generated to display data generating unit 133.

Figure 4:
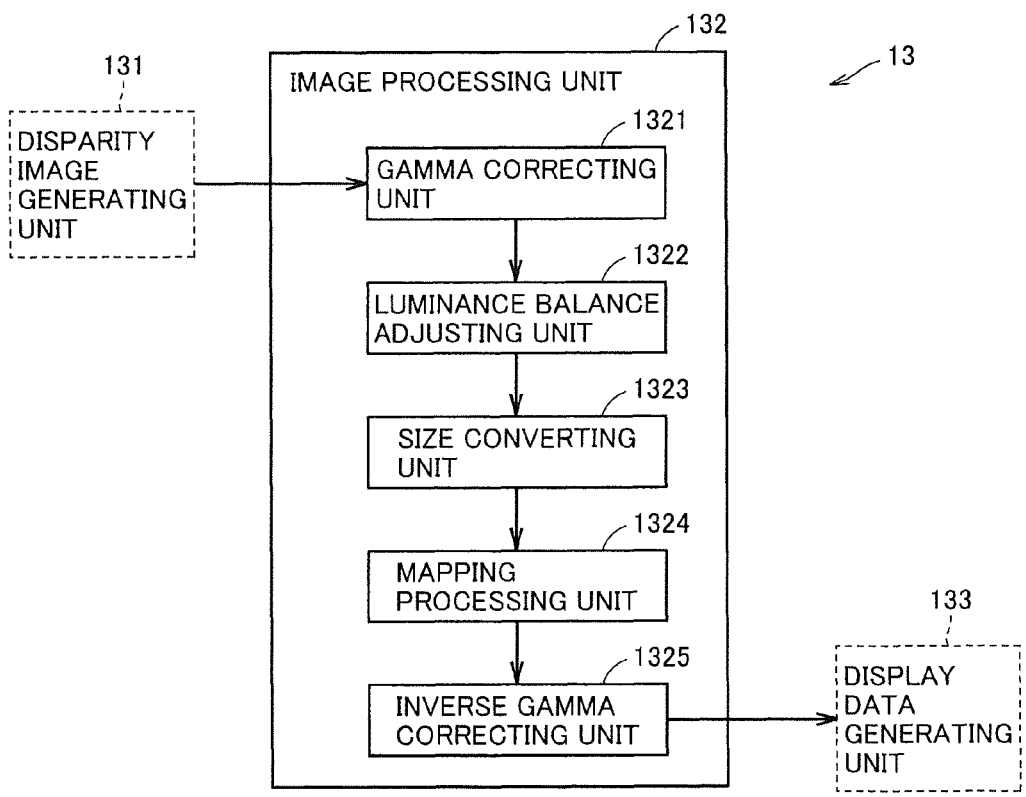
FIG. 4 depicts a configuration of an image processing unit.

FIG. 4 depicts a configuration of image processing unit 132. With reference to FIG. 4, image processing unit 132 includes a gamma correcting unit 1321, a luminance balance adjusting unit 1322, a size converting unit 1323, a mapping processing unit 1324, and an inverse gamma correcting unit 1325. What processing is performed at image processing unit 132 is described in detail later. The processing at the constituent portions of image processing unit 132 is described in the section of "2. Detailed Configuration of Three-dimensional Image Display System 100" to be given later.

Display data generating unit 133 alternately arranges left-eye image display data and right-eye image display data that are passed on from image processing unit 132, so as to generate display data to be displayed on display unit 11 for delivery to liquid crystal controller 134. Liquid crystal controller 134 sends the display data to display unit 11, for example, according to timing signals such as perpendicular synchronous idles, so as to cause left-eye images and right-eye images to be displayed alternatively one by one, i.e., one image for one sub-frame. In this manner, in the present embodiment, one left-eye image and one right-eye image are displayed within one frame period. Liquid crystal controller 134 delivers synchronous idles to shutter controlling unit 12 in synchronization with the respective timings for displaying the left-eye image display data and the right-eye image display data on the display unit 11.

Shutter controlling unit 12 delivers according to the synchronous idles shutter control signals to control opening/closing of liquid crystal shutters 21L and 21R of shutter glasses 2. The control signals may be signals in any waveform, provided that the signals may be in synchronization with the display switching timing of the left-eye image and the right-eye image on display unit 11 and also that distinction is possible between which of a left-eye image and a right-eye image is to be displayed.

It is to be noted that distinction between left-eye images and right-eye images is not a requisite. Instead of the distinction, a configuration may be provided such that handling of left side and right side is switched manually. In addition, even in the case where the distinction is possible, such a mechanism for handling inversion may be provided on the side of shutter glasses 2.

Description is given here further in detail of the processing at image processing unit 132 to generate left-eye image display data and right-eye image display data based on the left-eye images and right-eye images that have been passed on from disparity image generating unit 131, luminance ratio data 60, and mode switch data 61.

Mode switch data 61 is a parameter for deciding the display mode of display unit 11. In three-dimensional image display system 100 according to the present embodiment, audience may select a mode to their tastes for three-dimensional image display from among at least two kinds of modes of (a) a mode (hereinafter referred to as a "3-D specific mode") in which images specifically suited for viewing with shutter glasses 2 worn are displayed, and (b) a mode (hereinafter referred to as a "2-D/3-D common mode") suitable for cases where those with and without shutter glasses 2 exist among the audience. It may also be so configured that a selectable mode (hereinafter referred to as a "2D specific mode") in which two-dimensional display is specifically performed may be provided in addition to the 3-D specific mode and the 2-D/3-D common mode. This mode selection input may be, for example, performed by using a configuration such as an appropriate button provided on image display apparatus 1. Alternatively, it is also preferred that the audience may select a mode by using a device such as a remote control on a setting screen to be displayed on the screen of image display apparatus 1. In addition, it is also preferred to apply a method wherein a motion sensor such as an infrared sensor or a CCD (Charge Coupled Device) and a glasses sensor configured to send notification from the side of glasses to the image display apparatus by means of radio waves and infrared rays are used to determine the kind (2-D or 3-D) that has been used by the previous user of image display apparatus 1 to change the mode based on the result of determination. The result of selection of the mode is given to image processing unit 132 as mode switch data 61.

Figure 5:
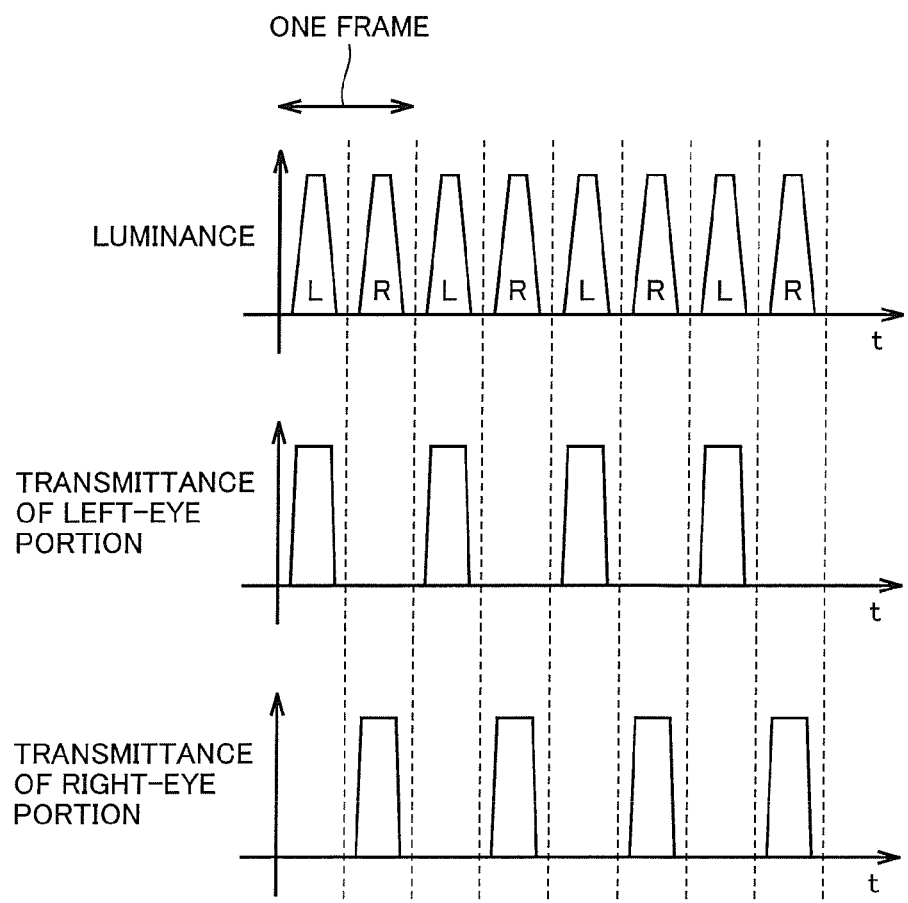
FIG. 5 depicts an image to be displayed on a display of the image display apparatus and the opening/closing timing of the liquid crystal shutter of the shutter glasses in the case of selection of a 3-D-specific mode.

FIG. 5 depicts the relationship between images to be displayed on display unit 11 of image display apparatus 1 and the opening/closing timing of liquid crystal shutters 21L and 21R of shutter glasses 2 in the case where the 3-D specific mode is selected.

Figure 6:
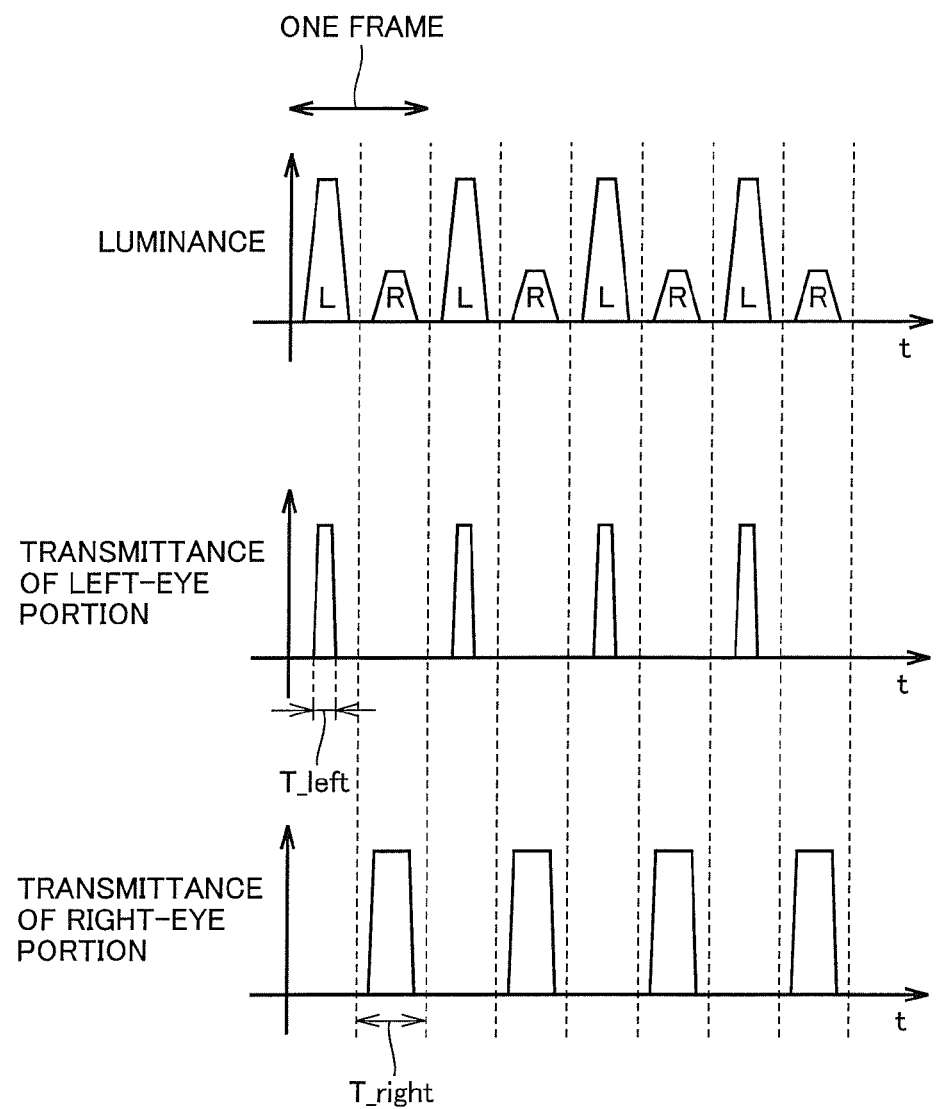
FIG. 6 depicts an image to be displayed on the display of the image display apparatus and the opening/closing timing of the liquid crystal shutter of the shutter glasses in the case of selection of a 2-D/3-D common mode.

FIG. 6 depicts the relationship between images to be displayed on display unit 11 of image display apparatus 1 and the opening/closing timing of liquid crystal shutters 21L and 21R of shutter glasses 2 in the case where the 2-D/3-D common mode is selected.

With reference to FIG. 5, in the case where the 3-D specific mode is selected, image processing unit 132 generates left-eye image display data and right-eye image display data such that left-eye images and right-eye images become equal in maximum luminance when displayed on display unit 11. In the uppermost row of FIG. 5, the portion marked with "L" corresponds to the luminance of the left-eye image, and the portion marked with "R" corresponds to the luminance of the right-eye image.

Image display apparatus 1 is configured to perform control over shutter glasses 2 in the following manner by shutter control signals of image display apparatus 1:

(1) Image display apparatus 1 controls the timing and periods for opening/closing of liquid crystal shutters 21L and 21R by the shutter control signals.

In this case, ternary signals, i.e., signals for turning on liquid crystal shutter 21, signals for turning on liquid crystal shutter 21R, and signals for turning off liquid crystal shutters 21L and 21R, are to be used.

(2) Image display apparatus 1 controls the timing for switching of liquid crystal shutter 21L or liquid crystal shutter 21R by the shutter control signals. Specifically, image display apparatus 1 controls the timing for switching from liquid crystal shutter 21L to liquid crystal shutter 21R or from liquid crystal shutter 21R to liquid crystal shutter 21L by the shutter control signals. Shutter glasses 2 are adapted to turn on liquid crystal shutter 21L or liquid crystal shutter 21R based on the timing within a predefined period. In this case, image display apparatus 1 may be equipped with a mechanism for switching response to the timing for liquid crystal shutter 21L or liquid crystal shutter 21R (3) Image display apparatus 1 controls the timing for turning on liquid crystal shutter 21L or liquid crystal shutter 21R by the shutter control signals. Specifically, image display apparatus 1 controls the timing for turning on either one of liquid crystal shutter 21L or liquid crystal shutter 21R. In this case, upon receipt of signals for turning on liquid crystal shutter 21L, shutter glasses 2 perform control in the following order at predefined timing: Liquid crystal shutter 21L is turned off, liquid crystal shutter 21R is turned on, and liquid crystal shutter 21R is turned off. Then, shutter glasses 2 are in standby for the next timing for turning on liquid crystal shutter 21L.

In some cases, information indicating the predefined period of the above (2) and information indicating the predefined timing of the above (3) are embedded in the shutter control signals. Alternatively, a switch may be provided on shutter glasses 2 to change and set both the kinds of information.

In the case where a hold-type liquid crystal display apparatus is used as image display apparatus 1, it is preferred that the opening/closing timing (phase and/or period) of the shutter of shutter glasses 2 be adjusted to reduce crosstalk that may occur in viewing 3-D images. With reference to FIG. 6, in the case where the 2-D/3-D common mode is selected, image processing unit 132 generates left-eye image display data and right-eye image display data such that the left-eye image to be displayed on display unit 11 is to have maximum luminance L_left that is higher than maximum luminance L_right of the right-eye image in the same frame. In other words, in the 2-D/3-D common mode of the present embodiment, left-eye image display data and right-eye image display data are generated such that the left-eye image has average luminance that is higher than the average luminance of the right-eye image in the same frame to be displayed on display unit 11. The average luminance indicates the light emission quantity of the display (display unit 11) per unit area.

The maximum luminance L_left of the left-eye image is luminance that is available when the highest possible tone (the brightest possible tone) that the pixels of the left-eye image can take is displayed on display unit 11. Similarly, the maximum luminance L_right of the right-eye image is luminance that is available when the highest possible tone (the brightest possible tone) that the pixels of the right-eye image can take is displayed on display unit 11.

Luminance ratio data 60 is a ratio of the maximum luminance L_left of the left-eye image to the maximum luminance L_right of the right-eye image. Specifically, assuming that the value of luminance ratio data 60 is α, $$\alpha = L\_right/L\_Left.$$

Image processing unit 132 multiplies the tones of the pixels of the right-eye image received from disparity image generating unit 131 by α, so as to generate right-eye image display data (the tones of the pixels constituting the right-eye image). Hence, considering a case in which the source image has 256 tones ([0, 255]) in the case where, for example, the value of α is 0.5. In this case, the right-eye image display data is generated such that the right-eye image display data is to have a maximum tone of 186.

In image display apparatus 1, the tone data for use in calculation is linearized by gamma correcting unit 1321. Specifically, the number of tones and the luminance are in a proportional relationship.

More specifically, general video signals are provided on the assumption that the gamma value of regular monitors is 2.2, the following correction (conversion) is performed at gamma correcting unit 1321 and inverse gamma correcting unit 1325.

$$\text{Gamma correction: calculation tone value} = 255 \times (\text{input tone value}/255)^{2.2}$$

$$\text{Inverse gamma correction: output tone value} = 255 \times (\text{calculation tone value}/255)^{(1/2.2)}$$

Note that the calculation tone value, input tone value, and output tone value each take a value in the range [0, 255].

More specific description is as follows: Assuming α=0.5, the calculation tone value is as follows in the case where the input tone value is at the scalar maximum value (255):

$$\text{Calculation tone value} = 255 \times ((255/255)^{2.2}) = 255$$

The calculation tone value (255) is multiplied by α (0.5) to yield 127.5. Thus, the output tone value is as follows:

$$\text{Output tone value} = 255 \times (127.5/255)^{(1/2.2)} = 186.04$$

In this manner, image processing unit 132 generates the right-eye image display data such that the scalar maximum value is 186.

In the case where the input tone is in the range [0, 160], the calculation tone value is as follows:

Calculation tone value=255×((160/255)^2.2)=91

The calculation tone value (91) is multiplied by α (0.5) to yield 45.5. Thus, the output tone value is as follows:

Output tone value=255×(45.5/255)^(1/2.2)=116

In this manner, image processing unit 132 generates the right-eye image display data such that the scalar maximum value is 116.

To reduce calculation error involved in the conversion, it is preferred that a larger number of tones for the calculation tone value is secured than the number of tones for the input/output tone values. For example, calculation is suitably performed such that the number of tones for the calculation tone value is 1024 relative to the number of tones for the input tone value of 256.

It is also preferred that, in place of calculation of the power in actual number, the conversion be performed by using an appropriate accuracy table and interpolation operation.

In this manner, in the 2-D/3-D common mode, the right-eye image display data is generated such that the left-eye image to be displayed on display unit 11 has maximum luminance L_left that is higher than the maximum luminance L_right of the right-eye image. Thus, a stronger afterimage effect is given to left-eye images than to right-eye image for those who see the images displayed on display unit 11 without wearing shutter glasses 2. As a result, a situation is mitigated in which right-eye images and left-eye images are seen as if the images are partly overlapped with deviation from each other for those who do not wear shutter glasses 2. It is to be noted that, with increase in difference between the maximum luminance L_left of the left-eye image and the maximum luminance L_right of the right-eye image, the left-eye image gives stronger visibility while the right-eye image is hardly recognized visually to those who do not wear shutter glasses 2, which allows for visual recognition of the images displayed on display unit 11 with less uncomfortable feeling.

As depicted in FIGS. 5 and 6, when image display apparatus 1 of the present embodiment is seen with shutter glasses 2 on, liquid crystal shutter 21R for the right eye is closed within the period in which the left-eye image is displayed on display unit 11, such that the left-eye image is not to be visually perceived with the right eye of the viewer. Liquid crystal shutter 21L for the left eye is closed within the period in which the right-eye image is displayed on display unit 11.

Further, as seen from comparison between FIGS. 5 and 6, in the case of the 3-D specific mode (FIG. 5), liquid crystal shutter 21L for the left eye is in an open state within a period that is approximately equal to the period in which the left-eye image is displayed on display unit 11, whereas in the case of the 2-D/3-D common mode (FIG. 6), the liquid crystal shutter 21L for the left eye is in an open state within a portion (T_left) of the period in which the left-eye image is displayed on display unit 11. This is because, as the left-eye image is higher in luminance than the right-eye image, the liquid crystal shutter 21R for the right eye is opened for a shorter period than the period in which the liquid crystal shutter 21L for the left eye is opened, so as to strike a balance in afterimage effect between the left eye and the right eye of the viewer wearing shutter glasses 2. As a result, the viewer wearing shutter glasses 2 visually recognizes three-dimensional images with a natural stereoscopic feeling offered by balanced combination of the left-eye image and the right-eye image. Hence, as depicted in FIG. 6, controlling the opening/closing timing of liquid crystal shutters 21L and 21R of shutter glasses 2 allows for a favorable effect of presenting images with less uncomfortable feeling to those with or without shutter glasses 2 even when they are mixedly exist among the viewers.

Herein, in the 2-D/3-D common mode, it is preferred that the ratio of the length of the period for opening liquid crystal shutter 21L for the left eye (T_left in FIG. 6) to the length of the period for opening liquid crystal shutter 21R for the right eye (T_right in FIG. 6) be decided based on the ratio (the above α value) of the maximum luminance L_right of the right-eye image to the maximum luminance L_left of the left-eye image. As described above, to strike a balance in afterimage effect between the left eye and the right eye of the viewer, it is preferred that, with decrease in α value, the length of period T_left for opening liquid crystal shutter 21L for the left eye is set shorter. For example, it is one of suitable modes to decide the values of T_left and T_right such that the relationship of α=L_right/L_left=T_left/T_right is established.

Shutter controlling unit 12 generates the shutter control signals for controlling the opening/closing liquid crystal shutters 21L and 21R based on the values of T_left and T_right.

For example, in the case where 60 left-eye images and 60 right-eye images are displayed alternately within one second and α=0.5, it is preferred to set the opening period of liquid crystal shutter 21L for the left eye is half the opening period of liquid crystal shutter 21R for the right eye, like T_left=8.35 msec and T_right=16.7 msec. By what proportion the opening period of liquid crystal shutter 21R for the right eye is set in the sub-frame period may be set in light of the brightness at the time of viewing the 3-D image and influence to crosstalk. When priority is placed on brightness, as in the above example, a value close to 16.7 msec is set, whereas when not much is desired with brightness, for example, 4 msec may be permissibly set for the opening period of liquid crystal shutter 21R for the right eye, and 2 msec may be permissibly set for the opening period of liquid crystal shutter 21L for the left eye.

As described above, with three-dimensional image display system 100 according to the first embodiment, selection of an operation mode, i.e., the 2-D/3-D common mode, is possible such that the maximum luminance L_left of the left-eye image is larger than the maximum luminance L_right of the right-eye image. Hence, the selection of this mode allows for mitigation of a situation in which right-eye images and left-eye images are seen as if the images are partly overlapped with deviation from each other for those who do not wear shutter glasses 2 in the case where those who do not wear shutter glasses 2 exist among the audience.

With three-dimensional image display system 100 according to the first embodiment, in the case of 2-D/3-D common mode, a mode is preferred in which the opening period of liquid crystal shutter 21L for the left eye is shorter than the opening period of liquid crystal shutter 21R for the right eye. According to this preferred mode, balance is taken in afterimage effect between the left eye and the right eye of the person wearing shutter glasses 2. Hence, according to this mode, a favorable effect is achieved such that those who do not wear shutter glasses 2 see two-dimensional images with less deviation, and those who wear shutter glasses 2 see natural three-dimensional images resulting from well balanced combination of left-eye images and right-eye images.

In the above description, change is not made in the tones of pixels of the left-eye image received from disparity image generating unit 131 and the tones of pixels of the right-eye image received from disparity image generating unit 131 is multiplied by a, so as to set the maximum luminance of the right-eye image lower than the maximum luminance of the left-eye image. However, image processing unit 132 may be so configured to generate left-eye image display data and right-eye image display data by multiplying the left-eye image as well as the right-eye image by a certain coefficient. For example, image processing unit 132 may multiply the tone of pixels of the left-eye image received from disparity image generating unit 131 by coefficient β1 so as to generate left-eye image display data, and image processing unit 132 may multiply the tone of pixels of the right-eye image received from disparity image generating unit 131 by coefficient β2 (0<β2<β1<1) so as to generate right-eye image display data. A favorable result is obtainable by setting, for example, β1=0.75 and β2=0.25, although it should be noted that this is merely an example.

<2. Detailed Configuration of Three-dimensional Image Display System 100>

Incidentally, according to a method as described above wherein image display apparatus 1 switchingly displays right-hand and left-hand images and the user select images to see by using shutter glasses 2, crosstalk and flickering are likely to occur when 3-D images are being displayed. Many measures therefore have to be taken to avoid such a situation. Such measures entail writing at higher frequencies. As has been described, as the resolution is increased with the increase in size of the screen of the image display apparatus, more simple and efficient design is possible according to the pixel separation method rather than the shutter separation method. Thus, description is given of a case in which the pixel separation method is applied to three-dimensional image display system 100.

Description is given below of the specific data processing in three-dimensional image display system 100 in the case where the total number of pixels (pixel number) for use in display with image display apparatus 1 is larger than the pixel number of video to be inputted to image display apparatus 1. Further, description is exemplarily given below of a case in which the pixel number of image display apparatus 1 is 3840×2160 ("4×"full HD (High Definition)) and the video to be inputted is full HD video (1920×1080). The refresh rate of image display apparatus 1 is 60 Hz. Image display apparatus 1 adopts RGB color model.

Further, description is exemplarily given of a configuration in which four pixels (vertical two pixels×lateral two pixels) is defined as one unit and two pixels thereof constitute left-eye pixels and the remaining two pixels constitute right-eye pixels. Specifically, description is exemplarily given of a configuration in which the one unit makes a rectangular shape when viewed with naked eyes. In the following, the four pixels constituting the one unit are also referred to as a "unit pixel group".

Figure 7:
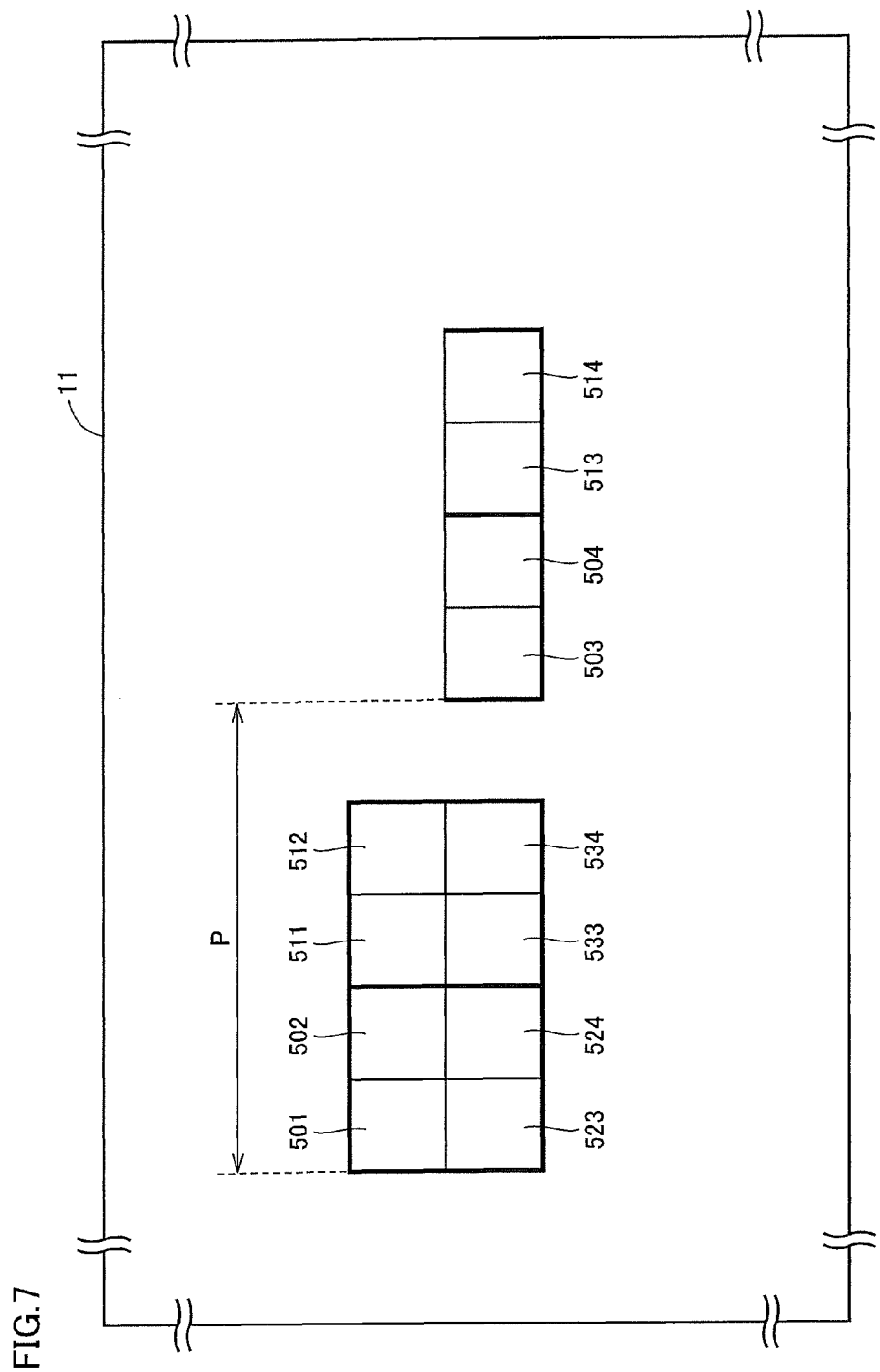
FIG. 7 depicts an example of a configuration in which two pixels lined horizontally constitute a left-eye image and the remaining two pixels lined horizontally constitute a right-eye image.

FIG. 7 depicts an example of a configuration in which, in the unit pixel groups, horizontally lined two pixels constitute left-eye pixels and the remaining horizontally lined two pixels constitute right-eye pixels. Specifically, in FIG. 7, description is exemplarily given of a configuration in which the right-eye pixels contained in a unit pixel group are arranged below the left-eye pixel group contained in the unit pixel group. In other words, in FIG. 7, left-eye pixels and right-eye pixels contained in a unit pixel group are adjacent to one another to establish a positional relationship in which the left-eye pixels is above the right-eye pixel group.

With reference to FIG. 7, four pixels 501, 502, 523, and 524 constitute one unit and four pixels 511, 512, 533, and 534 constitute one unit. Pixels 501 and 502 and pixels 511 and 512 are left-eye pixels. Pixels 523 and 524, pixels 533 and 534, pixels 503 and 504, and pixels 513 and 514 are right-eye pixels. Pixels 503 and 504 are pixels at positions shifted from pixels 501 and 502, respectively. Pixels 513 and 514 are pixels that are shifted similarly from pixels 511 and 512, respectively, based on the same disparity as that for pixels 50X (X: 1 to 4) horizontally by a distance P. Needless to say, in the case where disparity is different between 50X and 51X (X: 1~4), pixels 503 and 504 and pixels 513 and 514 are not adjacent to mutually-adjacent pixels 501 and 502 and pixels 511 and 512.

Figure 8:
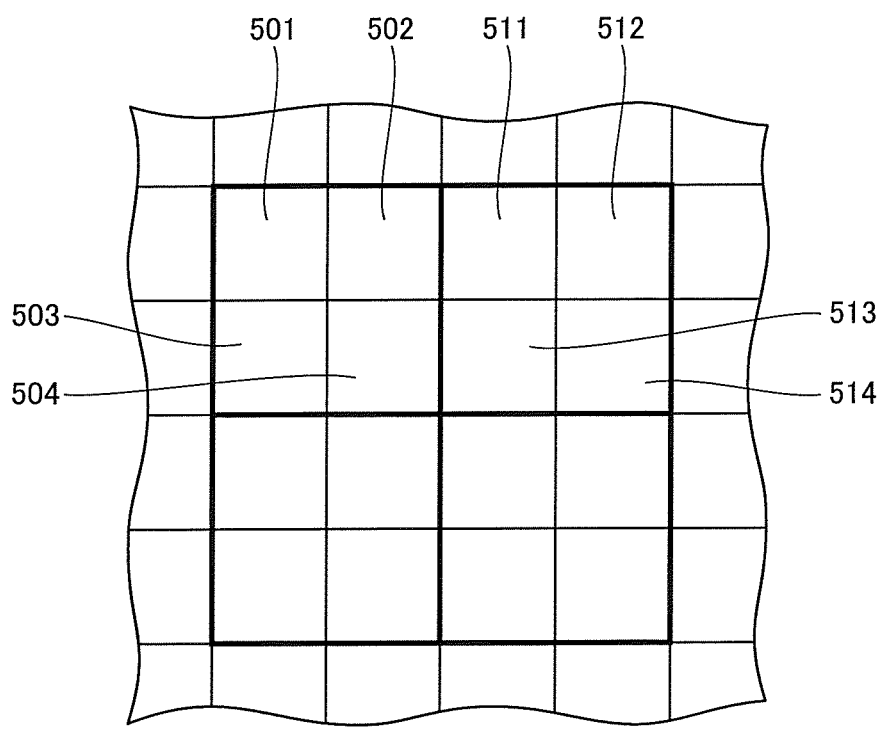
FIG. 8 depicts an array of pixels to be visually recognized by the viewer with shutter glasses.

FIG. 8 depicts an array of pixels to be visually recognized by the viewer wearing shutter glasses 2. With reference to FIG. 8, pixels 503 and 504 look as if they were immediately below pixels 501 and 502, respectively, with a sense of depth (a stereoscopic feeling) to the viewer wearing shutter glasses 2. To the viewer, pixels 513 and 514 look as if they were displayed immediately below 511 and 512.

As described above, image display apparatus 1 displays one pixels of an input signal both in the perpendicular direction and the horizontal direction by using four pixels of display unit 11, so as to have the input signal with the pixel number of 1920×1080 displayed by 3840×2160 pixels. Pixels 501 to 504, 511 to 514, 523, 524, 533, and 534 contain R pixels, G pixels, and B pixels.

Description is given below of the detailed processing in the above-described 2-D/3-D common mode.

Again with reference to FIG. 3, disparity image generating unit 131 generates a left-eye image with the pixel number of 1920×1080 and a right-eye image with the pixel number of 1920×1080 based on video signals 50. For example, in the case where video signals are based on the (2) transmission format, disparity image generating unit 131 performs processing (scaleup) for increasing the resolution and generates a left-eye image with the pixel number of 1920×1080 and a right-eye image with the pixel number of 1920×1080. In the case where frames in video signals are transmitted at a refresh rate higher than 60 Hz to image display apparatus 1, disparity image generating unit 131 stores the refresh rate on a memory (not shown). In this case, image display apparatus 1 performs image processing based on the refresh rate stored.

Again with reference to FIG. 4, disparity image generating unit 131 sends the left-eye images and right-eye images thus generated to gamma correcting unit 1321 of image processing unit 132. Gamma correcting unit 1321 performs gamma correction on the left-eye images and the right-eye images. Specifically, gamma correcting unit 1321 performs gamma correction such that the tone information indicating tones and luminance information indicating the corrected luminance establishes a linear (straight line) relationship. More specifically, gamma correcting unit 1321 performs gamma correction with the gamma value set as 1.0. Gamma correcting unit 1321 performs such gamma correction so as to obtain luminance information for a plurality of pixels through primary linear combination (linear sum).

Specifically, the corrected value, i.e., L (luminance) obtained by gamma correction is given by $$L(\text{luminance}) = L(\text{input})^{2.2}.$$

L (luminance) and L (input) are standardized to the values from 0 to 1; on the other hand, in an actual image display apparatus, it is preferred that integers multiplied by numerical values corresponding to the number of tones (accuracy) to be used be dealt as tone data. Specifically, the number of tones to be used is in 8 bit, then 255 is multiplied, while the number is in 10 bit, then 1023 is multiplied, so as to use the resultant values as tone data.

Luminance balance adjusting unit 1322 adjusts luminance balance between the gamma-corrected left-eye images and right-eye images based on luminance ratio data 60. Luminance balance adjusting unit 1322 adjusts, for example, the ratio of luminance between the left-eye image and the right-eye image to 2:1 on the basis of the above-described unit pixel group.

In the foregoing, description is exemplarily given of a configuration in which luminance balance adjusting unit 1322 adjusts the ratio of luminance between the left-eye image and the right-eye image to 2:1 (the value of ratio to "2"); however, the value of ratio is not limited to "2". However, the value of ratio is preferably in a range of 2 to 8. This is because of the following.

Setting an excessively large value for the above value of ratio entails shortening of period for opening liquid crystal shutter 21L of shutter glasses 2 according to the value of ratio, which may cause diminish in luminance at the time of viewing 3-D images. Contrarily, setting an excessively small value for the above value of ratio may lead to increase crosstalk between the left-eye image and the right-eye image at the time of viewing 2-D images. The crosstalk indicates a phenomenon of mixing of edges and/or change in color feeling that may occur when images with disparity are viewed simultaneously.

With respect to video involving comparatively large disparity, for example, video with a strong sense of depth such as those in which an object such as a character flies out from a plain to a considerable degree, it is preferred that the above value of ratio take a smaller value. It may be added that larger disparity may cause deviation (distance P) between the right-hand and left-hand images on image display apparatus 1, which may result in noticeable crosstalk. Hence, it is preferred that the above value of ratio be set to a larger value such that the video on one hand will be strongly perceived.

Moreover, in image display apparatus 1, the above value of ratio may be changed by means of a menu screen or a switch according to the display image and the taste of the user.

Generally, video that looks like projecting forward from the display surface (looks near) involves greater disparity as compared with video that looks like being withdrawn backward from the display surface (looks far). Thus, it is preferred that luminance balance adjusting unit 1322 be configured as follows: Luminance balance adjusting unit 1322 compares the left-eye image and the right-eye image to determine the image type. Then, luminance balance adjusting unit 1322 sets a larger value for the above ratio with respect to the former, i.e., the image that looks like projecting forward, and a smaller value for the above ratio with respect to the latter, i.e., the image that looks like being withdrawn backward, based on the result of determination.

Size converting unit 1323 performs size conversion on the left-eye image and the right-eye image with the luminance balance adjusted, according to the total pixel number (3840× 2160) of display unit 11. Mapping processing unit 1324 performs mapping, i.e., distributes luminance, of the luminance information to the size-converted left-eye image and right-eye image, which luminance information results from adjustment by luminance balance adjusting unit 1322. Inverse gamma correcting unit 1325 performs inverse gamma correction on the mapped left-eye image and right-eye image according to the gamma characteristic of display unit 11.

For the panel with γ of 2.2, the inverse gamma-corrected value (L (output)) is given by $$L(\text{output}) = L^{\wedge}(1/2.2).$$

It should be noted that the mark "^(hatmark)" is an operator indicating the power calculation.

Apparently, as L of the above equation is standardized in the range of 0 to 1, use is available of tone data in integer that is multiplied by an integer corresponding to the tone number to be used. It is also preferred that the tone data be used. Since both the gamma correction and the inverse gamma correction involve complex arithmetic operations in actual numbers, combination of LUT for conversion and interpolation operation is also permissible for facilitating the operation. It is also preferred that the LUT for conversion and the interpolation operation be combined.

Figure 9:
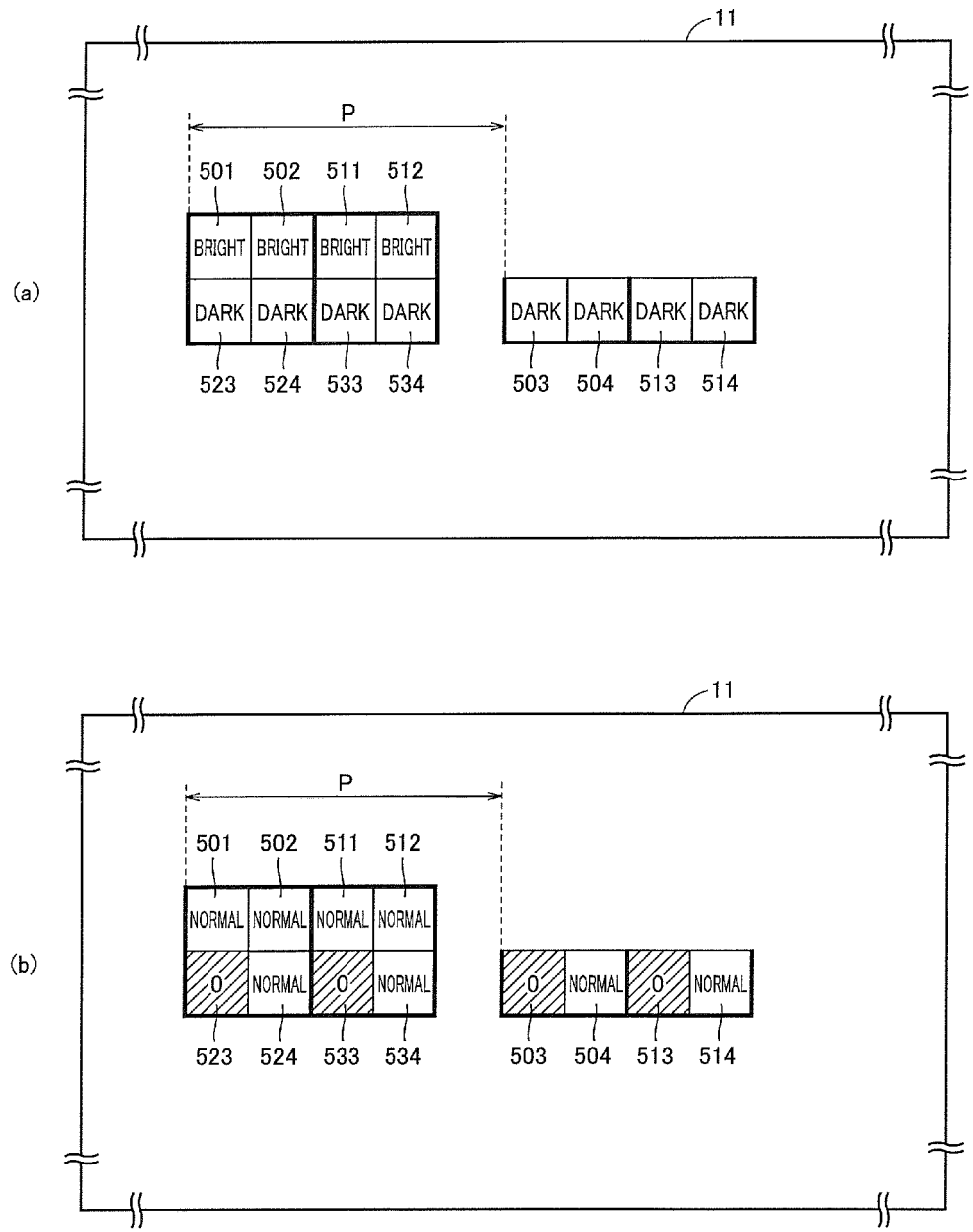
FIG. 9 is an explanatory diagram of mapping processing.

FIG. 9 is an explanatory diagram of the mapping processing. FIG. 9 (*a*) is an explanatory diagram of a first specific example of the mapping processing, whereas FIG. 9 (*b*) is an explanatory diagram of a second example of the mapping processing.

With reference to FIG. 9 (*a*), mapping processing unit 1324 doubles the luminance of pixel 501 and the luminance of pixel 502. In addition, the sum of the luminance of pixel 511 and the luminance of pixel 512 is doubled. Mapping processing unit 1324 does not change the sum of the luminance of pixel 523 and the luminance of pixel 524. Mapping processing unit 1324 also does not change the sum of the luminance of pixel 533 and the luminance of pixel 534. Description is given below of the processing by way of specific examples.

In the case where the sum of the luminance of pixel 501 and the luminance of pixel 502, the pixels 501 and 502 being yet to be mapped, is, for example, "20", mapping processing unit 1324 sets the sum of the luminance of pixel 501 and the luminance of pixel 502 to "40". In the case where the sum of the luminance of pixel 511 and the luminance of pixel 512, the pixels 511 and 512 being yet to be mapped, is similarly, for example, "20", mapping processing unit 1324 sets the sum of the luminance of pixel 511 and the luminance of pixel 512 to "40". In the case where the sum of the luminance of pixel 523 and the luminance of pixel 524, the pixels 523 and 524 being yet to be mapped, is, for example, "30", mapping processing unit 1324 sets the sum of the luminance of pixel 523 and the luminance of pixel 524 to "30" without change. In the case where the sum of the luminance of pixel 533 and the luminance of pixel 534, the pixels 533 and 534 being yet to be mapped, is, for example, "10", mapping processing unit 1324 sets the sum of the luminance of pixel 533 and the luminance of pixel 534 to "10" without change.

Further, mapping processing unit 1324 adjusts the luminance of pixel 501, the luminance of pixel 523, the luminance of pixel 511, and the luminance of pixel 533 in the same manner as the luminance of pixel 502, the luminance of pixel 524, the luminance of pixel 512, and the luminance of pixel 534, respectively. The adjustment is described as follows when applied to the above specific examples.

With respect to pixels 501 and pixel 502, mapping processing unit 1324 divides "40" equally to set the luminance of each of pixels 501 and 502 to "20". With respect to pixels 511 and pixel 512, mapping processing unit 1324 divides "40" equally to set the luminance of each of pixels 511 and 512 to "20". With respect to pixels 523 and pixel 524, mapping processing unit 1324 divides "30" equally to set the luminance of each of pixels 523 and 524 to "15". With respect to pixels 533 and pixel 534, mapping processing unit 1324 divides "10" equally to set the luminance of each of pixels 533 and 534 to "5".

In this manner, the luminance is set to "20" for pixels 501, 502, 511, and 512, which are left-eye pixels, and the luminance is set to "15", "15", "5", and "5" respectively for pixels 523, 524, 533, and 534, which are right-eye pixels.

Mapping processing unit 1324 performs such mapping processing to each unit pixel group, such that the ratio of luminance between the left-eye image and the right-eye image constituting the 3-D image as a whole is adjustable to the value adjusted by luminance balance adjusting unit 1322, i.e., 2:1.

With reference to FIG. 9 (*b*), mapping processing unit 1324 sets the luminance of pixel 501, the luminance of pixel 502, and the luminance of pixel 524 to a mutually same value of luminance. Mapping processing unit 1324 sets the luminance of pixel 523 to "0". Mapping processing unit 1324 performs mapping processing on each unit pixel group, such that the ratio of luminance between the left-eye image and the right-eye image constituting the 3-D image as a whole is adjustable to the value adjusted by luminance balance adjusting unit 1322, i.e., 2:1.

Whether the mapping is performed as depicted in FIG. 9 (*a*) or as depicted in 9 (*b*) depends on pixel mapping pattern data (not shown) that is stored in advance on video processing unit 13. The pixel mapping pattern data is data that represents spatial distribution of pixels contributing to the display of the left-eye image and pixels contributing to the display of the right-eye image on display unit 11.

Since the processing at display data generating unit 133, liquid crystal controller 134, and shutter controlling unit 12 is as described above, repetitive description is not given here.

With image display apparatus 1, as described above, those who do not wear shutter glasses 2 see two-dimensional images with less deviation, and those who wear shutter glasses 2 see national three-dimensional images in which left-eye images and right-eye images are combined in a well balanced manner.

Second Embodiment

Another embodiment of the present invention is described with reference to FIGS. 10 to 12. In the above-described first embodiment, a configuration is described in which left-eye images and right-eye images are displayed alternately one by one, namely, one for one sub-frame (see FIG. 6). In the second embodiment, a description is given of a configuration in which left-eye images and right-eye images are contained in the same frames, for display.

Figure 10:
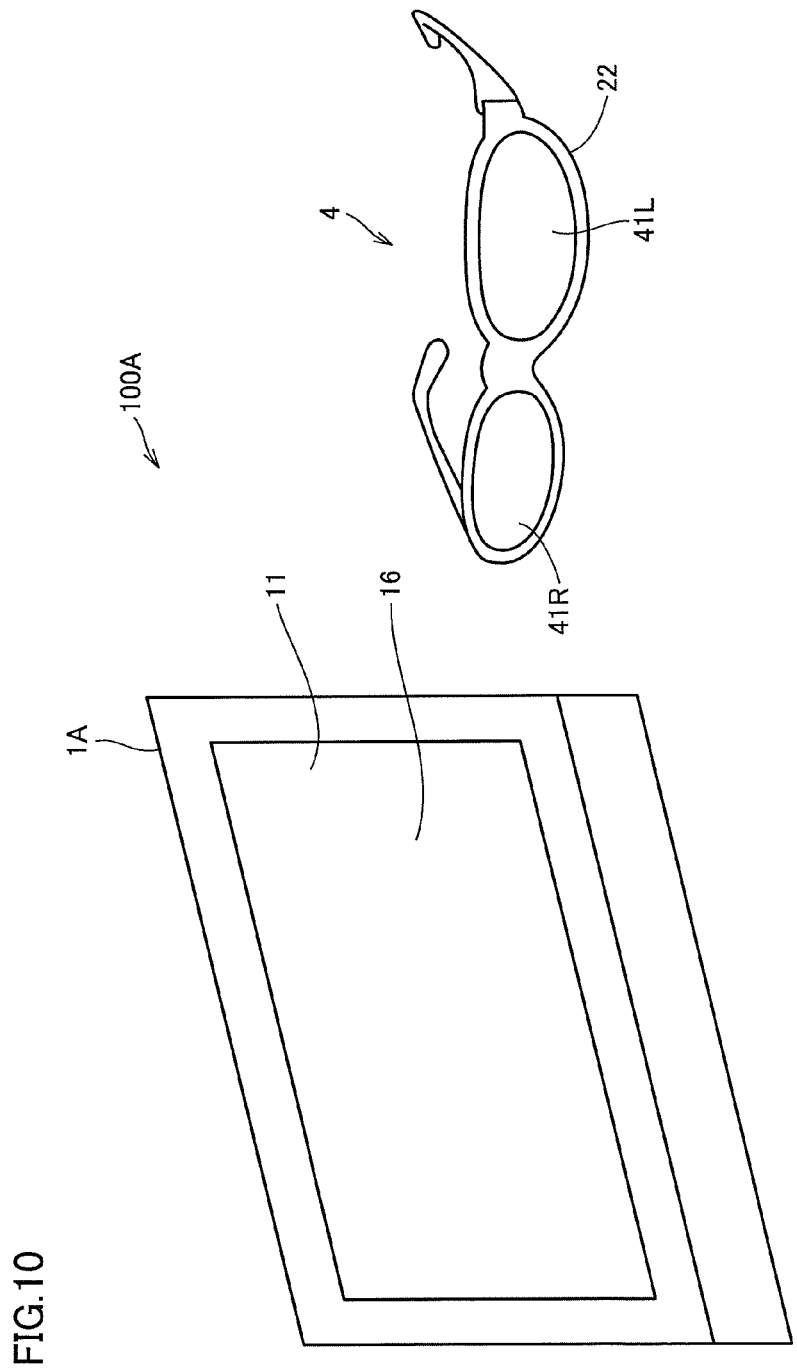
FIG. 10 depicts a schematic configuration of a three-dimensional image display system according to another embodiment.

FIG. 10 depicts a schematic configuration of a three-dimensional image display system 100A. With reference to FIG. 10, three-dimensional image display system 100A includes an image display apparatus 1A and polarization glasses 4.

Figure 11:
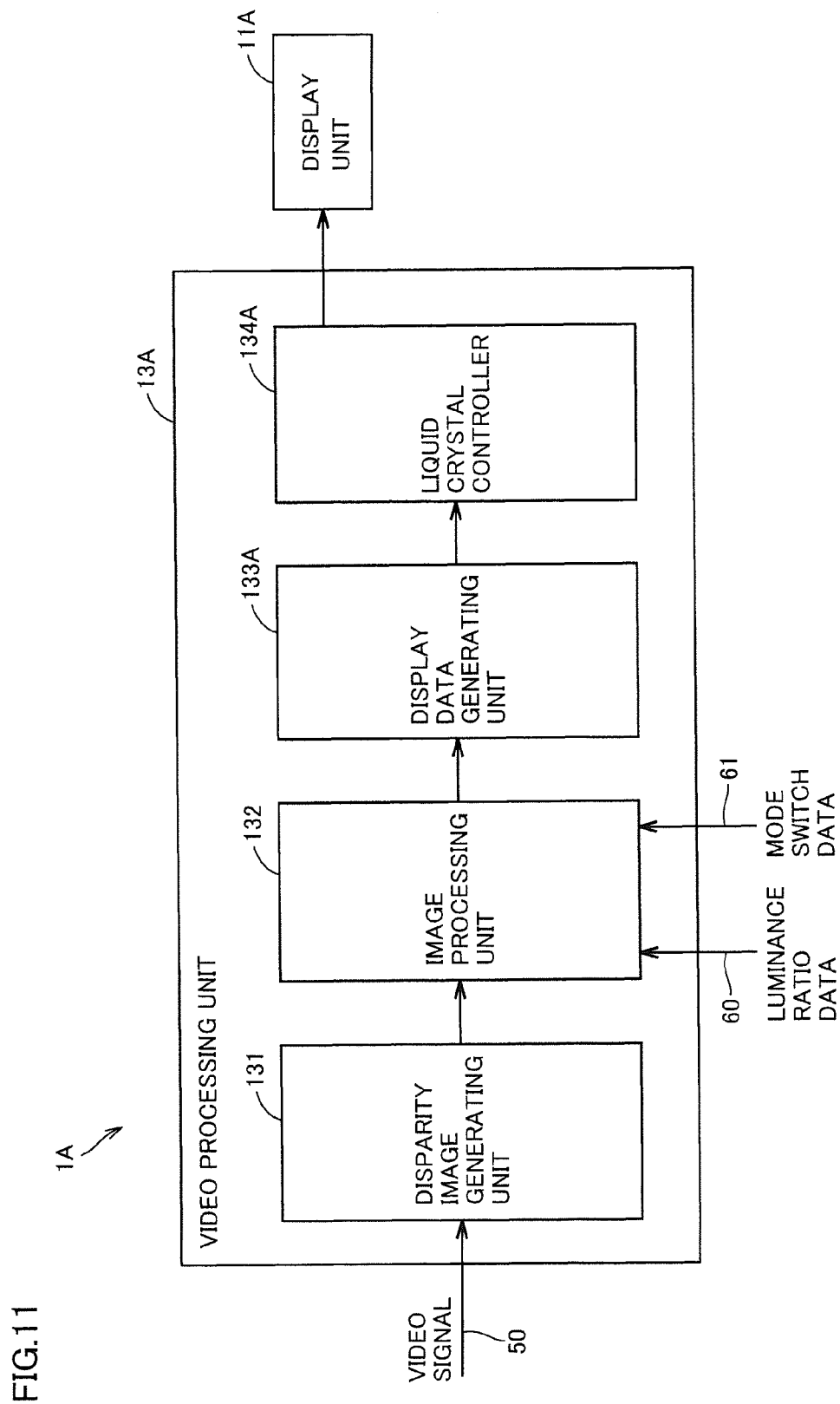
FIG. 11 is a block diagram depicting a functional configuration of an image display apparatus.

FIG. 11 is a block diagram depicting a functional configuration of image display apparatus 1A. With reference to FIG. 11, image display apparatus 1A includes a video processing unit 13A and a display unit 11A. Video processing unit 13A includes disparity image generating unit 131, image processing unit 132, a display data generating unit 133A, and a liquid crystal controller 134A. Image display apparatus 1A adopts RGB color model.

Figure 12:
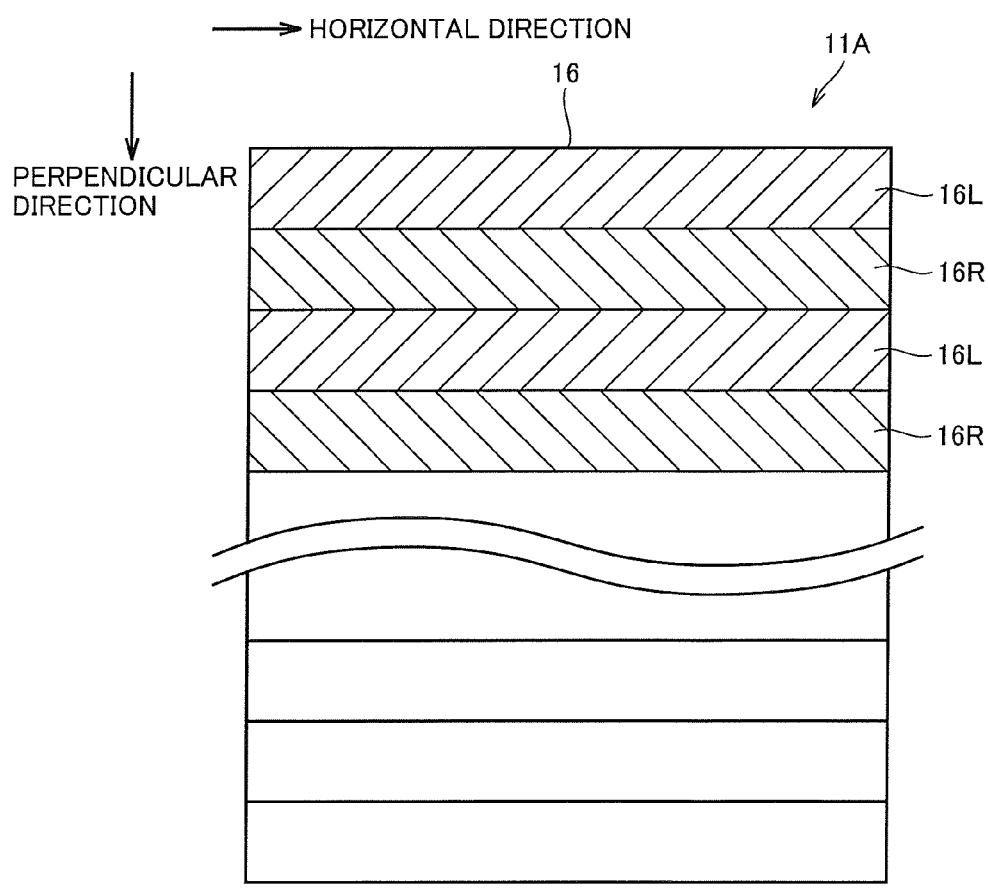
FIG. 12 depicts a surface of a display.

FIG. 12 depicts a surface of display unit 11A. With reference to FIG. 12, image display apparatus 1A includes a polarization filter layer 16 on a surface of display unit 11A. Polarization filter layer 16 is configured such that, for example, polarization filters with different directions of polarization are arranged alternately per line (scan line) of display unit 11A. A linear polarization filter or a circular polarization filter is used for the polarization filter.

In image display apparatus 1A, linear polarization filters 16L are arranged at odd-numbered lines of display unit 11 such that the polarization axes thereof are in parallel with the lines, and linear polarization filters 16R are arranged at even-numbered lines such that the polarization axes thereof are in parallel with the lines. Display unit 11A displays the left-eye image in the odd-numbered lines and the right-eye image in the even-numbered lines. Linear polarization filters 16L are the same in transmittance as linear polarization filters 16R.

Display data generating unit 133A receives left-eye image display data and right-eye image display data from image processing unit 132. Display data generating unit 133A inserts the left-eye image display data into the odd-numbered lines and the right-eye image display data into the even-numbered lines. Thus, display data generating unit 133A generates data for display for one frame (display data). Display data generating unit 133A sends the generated display data to liquid crystal controller 134A.

Liquid crystal controller 134A sends the display data to display unit 11A according to timing signals such as perpendicular synchronous idles to cause display unit 11A to display video per frame.

Again with reference to FIG. 10, polarization glasses 4 have in its left eye portion a linear polarization filter 41L and in its right eye portion a linear polarization filter 41R, in such a manner that linear polarization filter 41L coincides in polarization axis with linear polarization filter 16L, and that linear polarization filter 41R coincides in polarization axis with linear polarization filter 16R. The transmittance of linear polarization filter 41L is half the transmittance of linear polarization filter 41R. In place of linear polarization filer 42L and linear polarization filter 42R, circular polarization filters that are different from each other in direction of rotation may also be used.

According to this configuration, the left eye portion of polarization glasses 4 permits transmission of light based on left-eye images and restricts transmission of light based on right-eye images. The right eye portion of polarization glasses 4 restricts transmission of light based on left-eye image and permits transmission of light based on right-eye images. Hence, left-eye images displayed in the odd-numbered lines are visually perceived with the left eye of the viewer wearing polarization glasses 4 and right-eye images displayed in the even-numbered lines are visually perceived with the right eye of that viewer. This allows for visual recognition of three-dimensional images with a sense of depth by the viewer.

As has already been described, since the transmittance of linear polarization filter 41L is half the transmittance of linear polarization filter 41R, the ratio of luminance of light that has transmitted through filters 41L and 41R may be set to 1:1. Specifically, the ratio of luminance between the left-eye image and the right-eye image, which has been adjusted to 2:1 by luminance balance adjusting unit 1322, is changeable to 1:1 by filters 41L and 41R. Thus, image display apparatus 1A is configured to allow the viewer wearing polarization glasses 4 to visually recognize three-dimensional images with a sense of depth.

Meanwhile, for the viewers who do not wear polarization glasses 4, a stronger afterimage effect is produced by left-eye images at odd-numbered lines rather than by right-eye images at even-numbered lines. As a result, a situation is mitigated in which right-eye images and left-eye images seem to be partly overlapped with deviation from each other to those who do not wear polarization glasses 4.

While an example is described here in which polarization filters with different directions of polarization are arranged alternately by line, such a configuration is also possible that polarization filters with different directions of polarization are arranged alternately on the basis of one pixel or a plurality of pixels, and that the display of the left-eye image and the right-eye image are controlled in the unit of pixel.

With image display apparatus 1A thus configured, those who do not wear polarization glasses 4 see two-dimensional images with less noticeable deviation, and those who wear polarization glasses 4 see natural three-dimensional images in which left-eye images and right-eye images are combined in a well-balanced manner.

<Variation>

With polarization glasses 4, a case is exemplarily described in which the transmittance of linear polarization filter 41L is half the transmittance of polarization filter 41R. The configuration of polarization glasses 4 is not limited thereto. For example, polarization glasses 4 may be configured such that the transmittance of linear polarization filter 41L is equalized to the transmittance of linear polarization filter 41R, and that liquid crystal shutters are provided according to the filters. Controlling the opening/closing periods of the liquid crystal shutters allows for change of the ratio of luminance between the left-eye image and the right-eye image to 1:1 for the viewers wearing polarization glasses 4. With polarization glasses 4 thus configured, the viewers wearing polarization glasses 4 can adjust the luminance balance by using polarization glasses 4.

Further, use of polarization glasses 4 with which luminance balance is changeable enables change of luminance balance according to the video and intended use also on the side of image display apparatus 1. Hence, image display apparatus 1 provides for a wider range of application.

Alternatively, the transmittance of linear polarization filter 41L may be equalized to the transmittance of linear polarization filter 41R, and a neutral density filters may be provided in the position of the left eye.

In the case where the transmittance of linear polarization filter 41L is equalized to the transmittance of linear polarization filter 41R, polarization glasses 4 may also be configured as follows: Specifically, lenses or planar members for passing light (hereinafter referred to as "members such as lenses") may be provided in the left eye portion and the right eye portion of frame 22, and higher concentration of pigment (dye) may be added to the member such as a lens on the left eye side than the pigment (dye) to be added to the member such as a lens on the right eye side.

It is to be noted that modification may be made to polarization glasses described in connection with a third embodiment to be described later in the same manner as to polarization glasses 4.

Further, even in the case where image display apparatus 1A adopts the pixel separation method such that left-eye images and right-eye images are displayed alternately one by one, i.e., one image for one sub-frame, similar effects are obtained to those with the case where left-eye images and right-eye images are contained in the same frames, for display.

Third Embodiment

Still another embodiment of the present invention is described with reference to FIGS. 13 to 19.

In the case where the ratio of 2:1 is set between the luminance of the left-eye image and the luminance of the right-eye image in image display apparatuses 1 and 1A of the above-described first and second embodiments, the pixels for rendering the right-eye image emit light at half the luminance of the pixels for rendering the left-eye image with respect to each unit pixel group. Specifically, in image display apparatuses 1 and 1A, emission loss of 50% exists in displaying the left-eye image. In the case where the ratio of 4:1, i.e., the value of ratio of "4", is set between the luminance of the left-eye image and the luminance of the right-eye image in image display apparatuses 1 and 1A, it can be said that emission loss of 75% exists in displaying the left-eye image in image display apparatuses 1 and 1A. In this manner, emission loss increases in proportion to increase in value of ratio of luminance between the left-eye image and the right-eye image. In the present embodiment, description is given of a configuration for reducing the emission loss.

Figure 13:
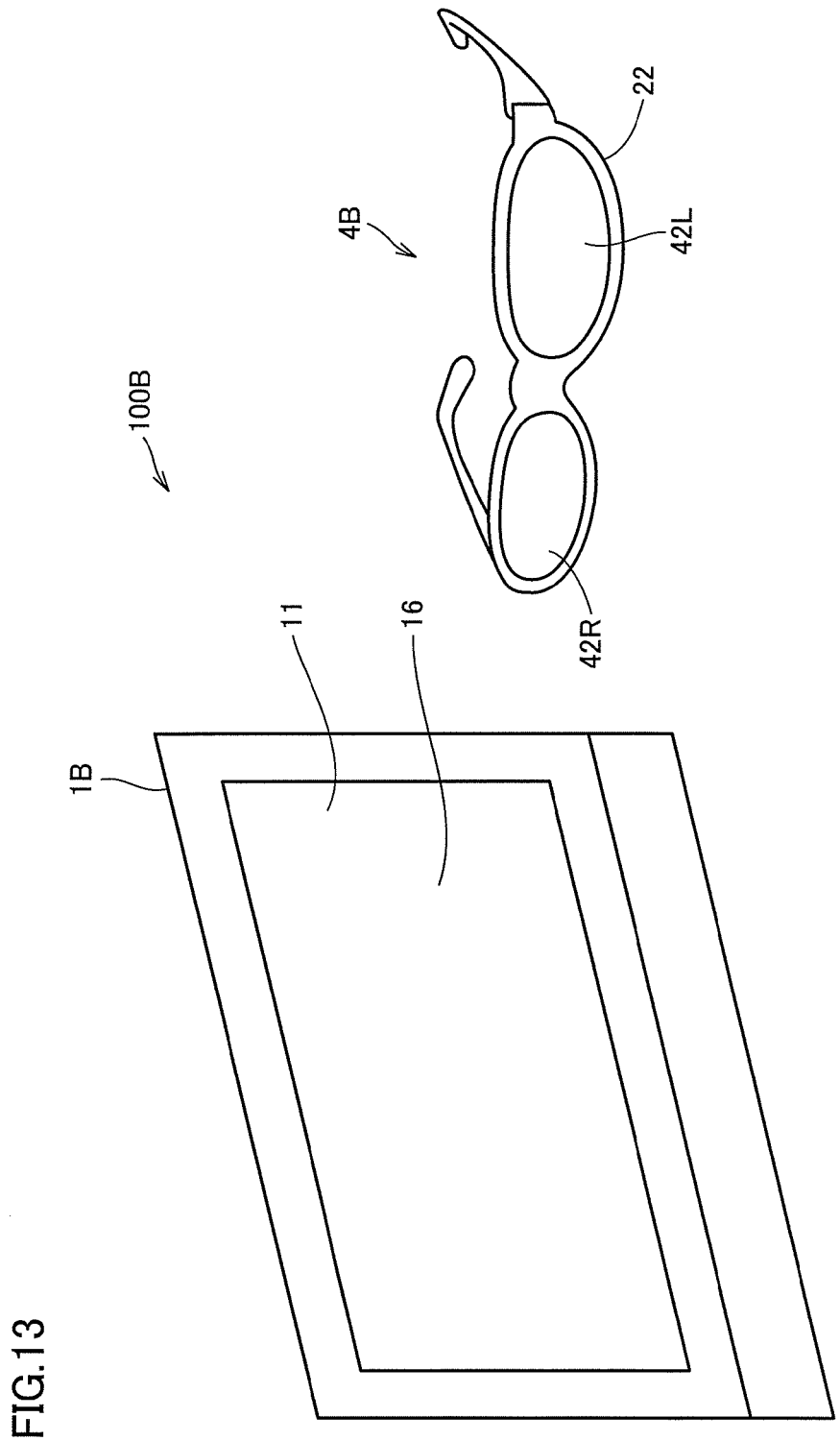
FIG. 13 is an outline diagram of the overall configuration of a three-dimensional image display system according to another embodiment.

FIG. 13 is an outline diagram depicting the overall configuration of a three-dimensional image display system 100B. With reference to FIG. 13, three-dimensional image display system 100B has an image display apparatus 1B and polarization glasses 4B.

In the following, description is exemplarily given of a case of image display apparatus 1B with the pixel number of 1920×1080 (full HD) and video to be inputted to image display apparatus 1B being SD (Standard Definition) video (640×360).

Figure 14:
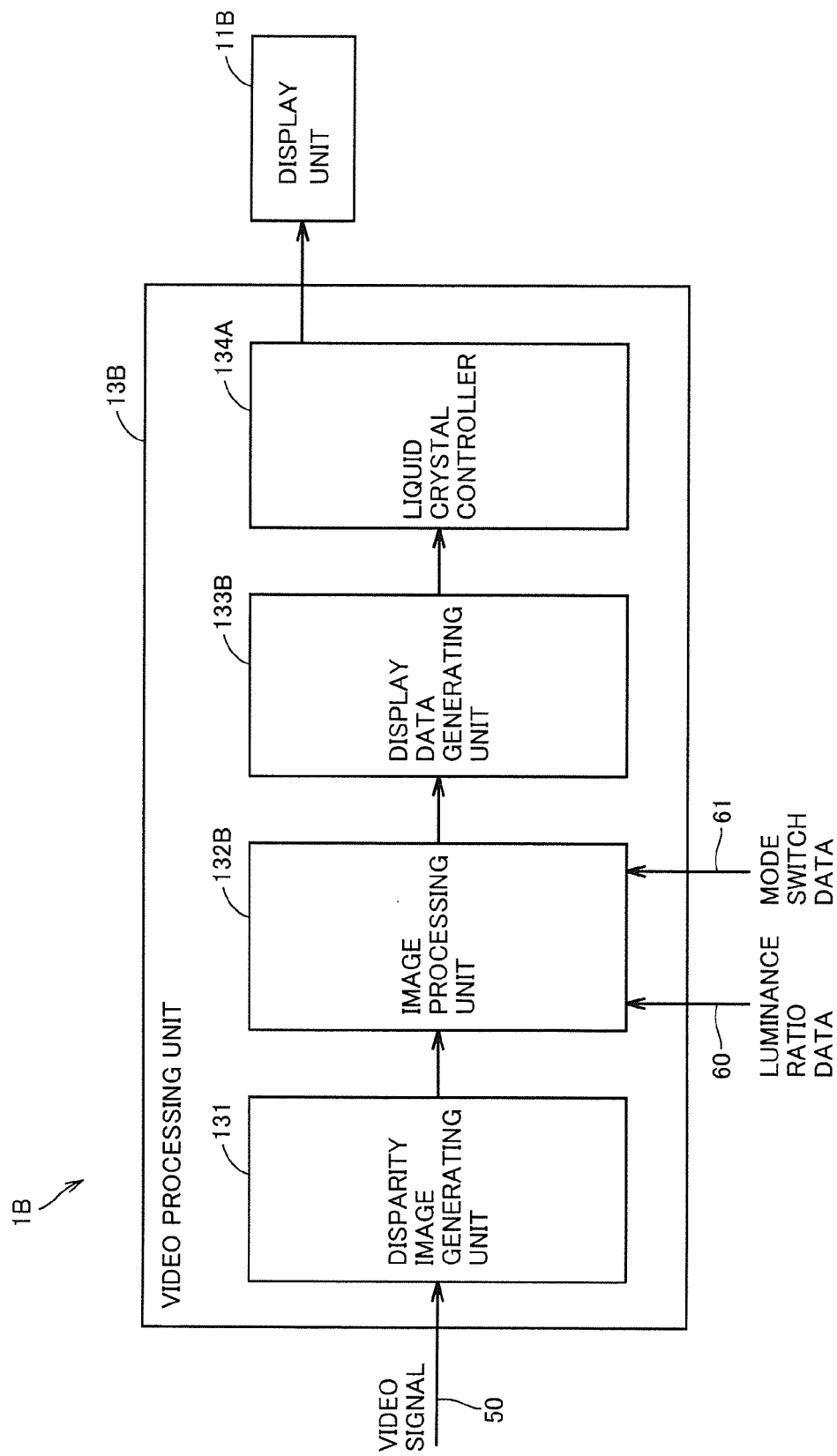
FIG. 14 is a block diagram of a functional configuration of an image display apparatus.

FIG. 14 is a block diagram depicting a functional configuration of image display apparatus 1B. With reference to FIG. 14, image display apparatus 1B includes a video processing unit 13B and a display unit 11B. Video processing unit 13B includes disparity image generating unit 131, an image processing unit 132B, a display data generating unit 133B, and a liquid crystal controller 134A. Image display apparatus 1B adopts RGB color model. Image processing unit 132B includes, as image processing unit 132, a gamma correcting unit, a luminance balance adjusting unit, a size converting unit, a mapping processing unit, and an inverse gamma correcting unit.

Figure 15:
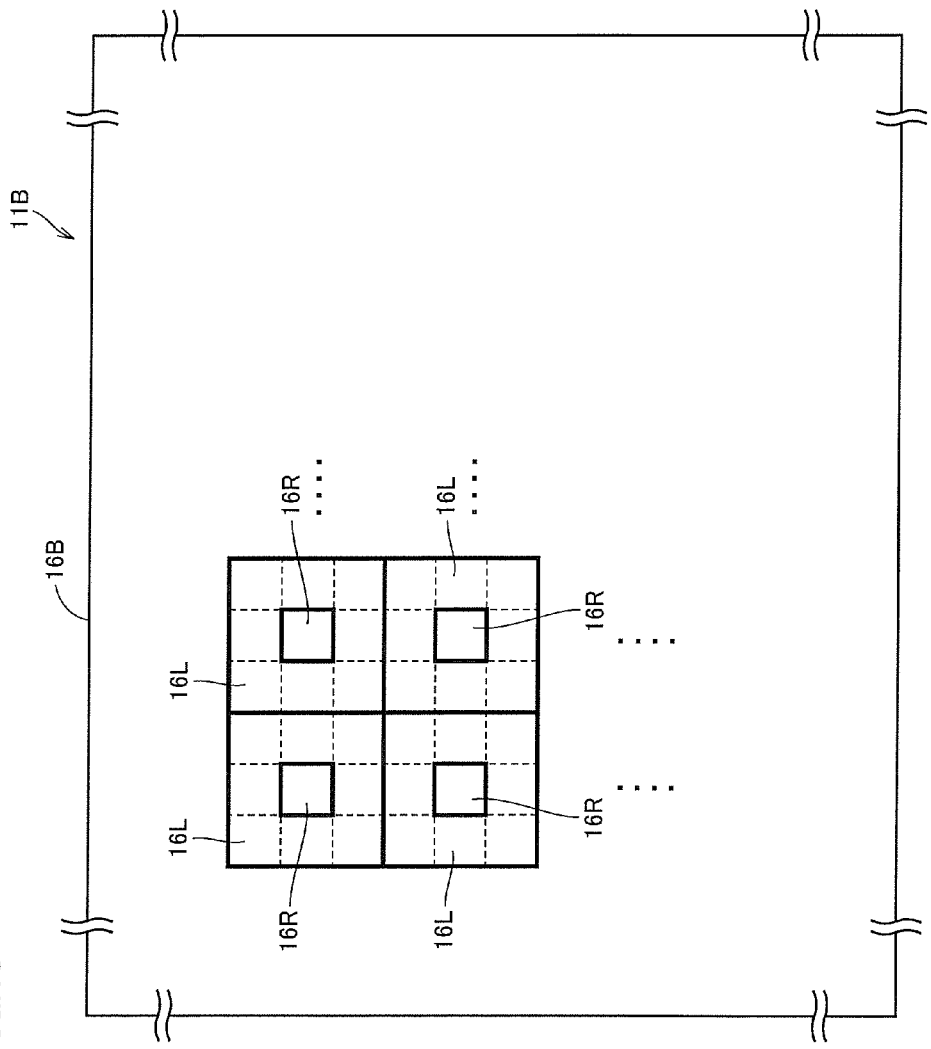
FIG. 15 depicts a surface of a display.

FIG. 15 depicts a surface of display unit 11B. With reference to FIG. 15, image display apparatus 1B has a polarization filter layer 16B on the surface of display unit 11B. Polarization filter layer 16B has linear polarization filters 16L in rectangular outer shape arranged continuously in perpendicular and horizontal directions. The rectangular shape is three pixels long in both the perpendicular and horizontal direction. Linear polarization filters 16L are arranged to enclose linear polarization filters 16R. Linear polarization filters 16R are arranged at the center of the rectangular shape. Linear polarization filters 16R have a rectangular shape that is one pixel long in both the perpendicular and horizontal directions. In place of linear polarization filters 16L and 16R, circular polarization filters that are different in direction of rotation may also be used.

In image display apparatus 1B, nine pixels (vertical three pixels×lateral three pixels) constitute one unit, and eight pixels constitute left-eye pixels and the remaining one pixel constitutes a right-eye pixel. Specifically, a description is exemplarily given of a configuration in which the one unit has a rectangular shape when viewed with naked eyes. In the following description, nine pixels constituting the one unit are also referred to as a "unit pixel group". The right-eye pixels are arranged in the perpendicular and horizontal directions at intervals of two pixels. In other words, the right-eye pixels are arranged continuously in the perpendicular and horizontal directions every three pixels.

Video processing unit 13B performs processing of arranging left-eye images and right-eye images in the left-eye pixels and the right-eye pixels, respectively, based on pixel mapping pattern data stored in advance. Linear polarization filters 16R are disposed on the right-eye pixels. Linear polarization filters 16L are disposed on the left-eye pixels.

Figure 16:
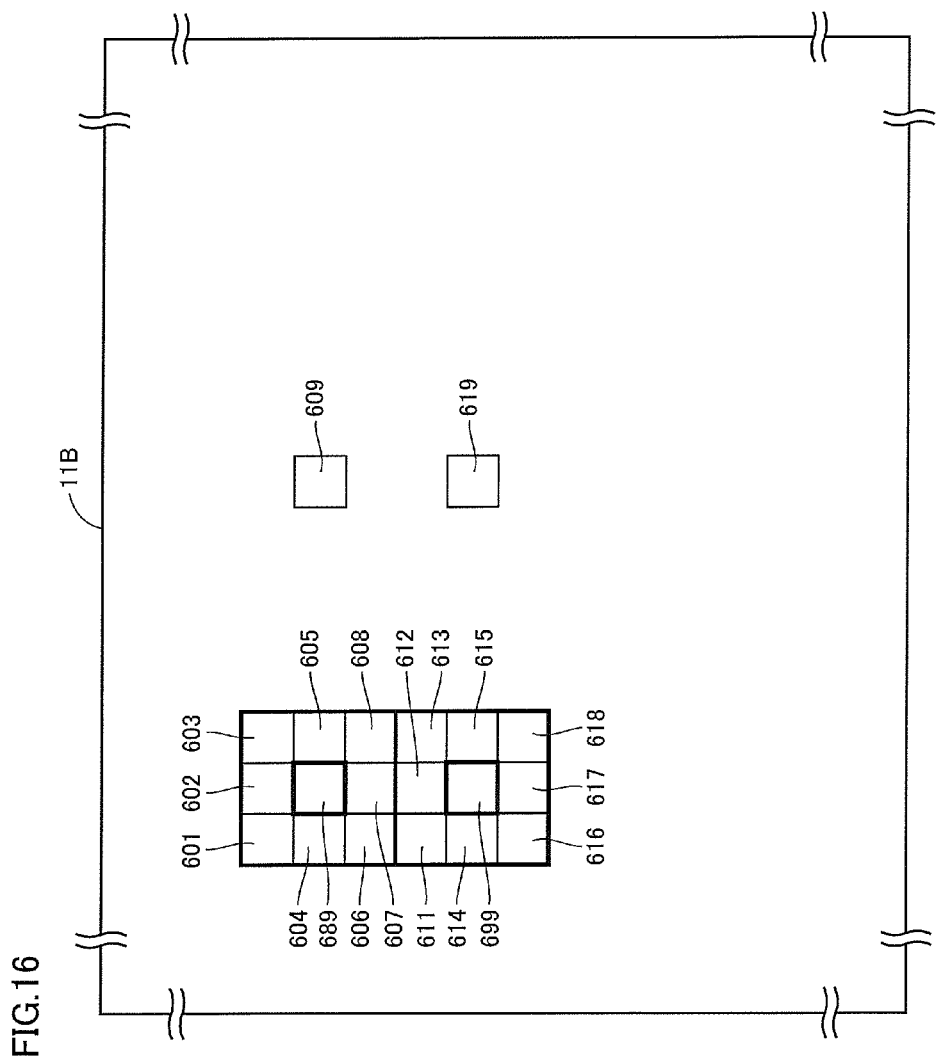
FIG. 16 depicts an example of a configuration in which eight pixels constitute a left-eye image and the remaining one pixel constitutes a right-eye image in a unit pixel group.

FIG. 16 depicts an exemplary configuration in which eight pixels constitute the left-eye image and the remaining one pixel constitutes the right-eye pixel in a unit pixel group. With reference to FIG. 16, nine pixels 601 to 608 and 689 and nine pixels 611 to 618 and 699 constitute unit pixel groups, respectively. Pixels 601 to 608 and pixels 611 to 618 are left-eye pixels. Pixel 689 and pixel 699 are right-eye pixels. Pixels 609 and 619 are pixels horizontally shifted by a distance P from pixels 689 and 699, respectively.

Figure 17:
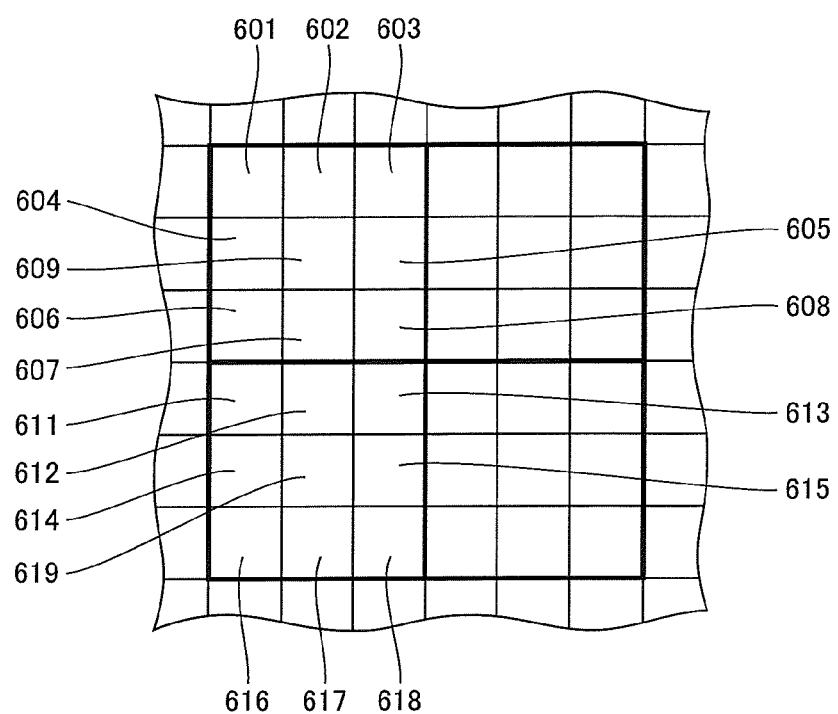
FIG. 17 depicts an array of pixels to be visually recognized by the viewer wearing polarization glasses.

FIG. 17 depicts an array of pixels that the viewer wearing polarization glasses 4B visually recognizes. With reference to FIG. 17, for the viewer wearing polarization glasses 4B, pixel 609 looks like being displayed at a position enclosed by eight pixels 601 to 608. For the viewer, pixel 619 looks like being displayed at a position enclosed by eight pixels 611 to 618.

Display data generating unit 133B inserts left-eye image display data into the positions corresponding to the left-eye pixels, i.e., the positions on even-numbered and odd-numbered lines, and inserts right-eye image display data into the positions corresponding to the right-eye pixels, i.e., the positions on odd-numbered and even-numbered lines. Thus, display data generating unit 133B generates displaying data for one frame (display data). Display data generating unit 133B sends the generated display data to liquid crystal controller 134A.

Liquid crystal controller 134A sends the display data to display unit 11B according to, for example, timing signals such as perpendicular synchronous idles, so as to cause video to be displayed on display unit 11B on the basis of one frame.

Again with reference to FIG. 13, polarization glasses 4B have a linear polarization filter 42L in the left-eye portion of polarization glasses 4 such that the polarization axis thereof coincides with the polarization axis of linear polarization filter 16L and includes linear polarization filter 42R in the right-eye portion such that the polarization axis thereof coincides with the polarization axis of linear polarization filter 16R. Linear polarization filter 42L has transmittance that is an eighth part of the transmittance of linear polarization filter 42R. In place of linear polarization filter 42L and linear polarization filter 42R, circular polarization filters that are different in direction of rotation may also be used. Polarization glasses 4B have the same configuration as that of polarization glasses 4 except that the transmittance is different from polarization glasses 4.

With image display apparatus 1B thus configured, those who do not wear polarization glasses 4B see two-dimensional images with less noticeable deviation, and those who wear polarization glasses 4 see natural three-dimensional images in which left-eye images are combined with right-eye images in a well-balanced manner. Further, in image display apparatus 1B, increase in emission loss is preventable even with a larger value of ratio of luminance between the left-eye image and right-eye image.

Figure 18:
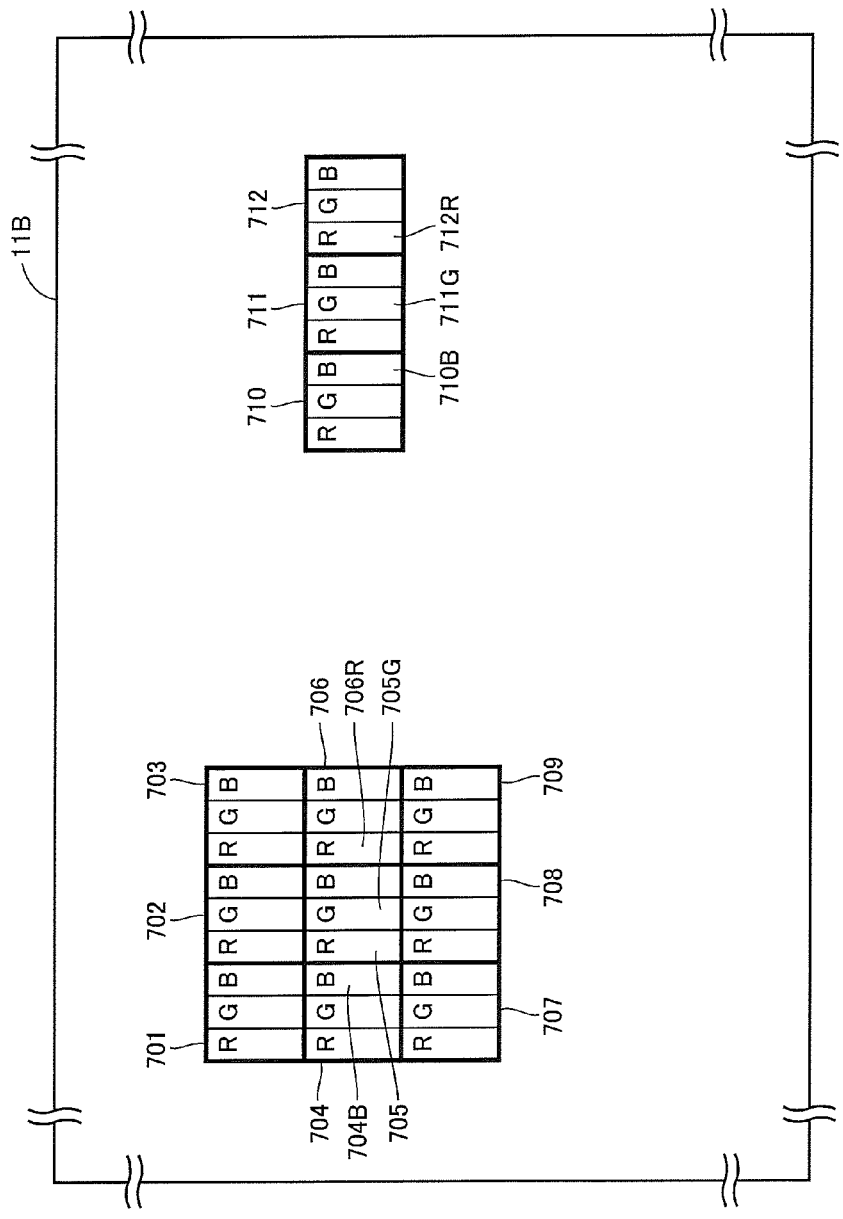
FIG. 18 is an explanatory diagram of the arrangement of the right-eye pixels.

The arrangement of the right-eye pixels is not limited to that depicted in, for example, FIG. 16. The pixels each contain R pixels, G pixels, and B pixels, and thus the arrangement of the right-eye pixels may be also set as follows:

FIG. 18 is an explanatory diagram of the arrangement of right-eye pixels. With reference to FIG. 18, pixels 701 to 719 constitute one unit pixel group. More specifically, pixels of pixels 701 to 709 other than a pixel 704B, a pixel 705G, and a pixel 706R constitute left-eye pixels. Meanwhile, pixel 704B, pixel 705G, and pixel 706R of pixels 701 to 709 constitute right-eye pixels. A pixel 710B in pixel 710, a pixel 711G in pixel 711, and a pixel 712R in pixel 712 also constitute right-eye pixels. In this case, the array of linear polarization filters 16L and 16R in polarization filter layer 16B is also to be changed in shape and position so as to conform to the array of the left-eye pixels and right-eye pixels of FIG. 18.

Figure 19:
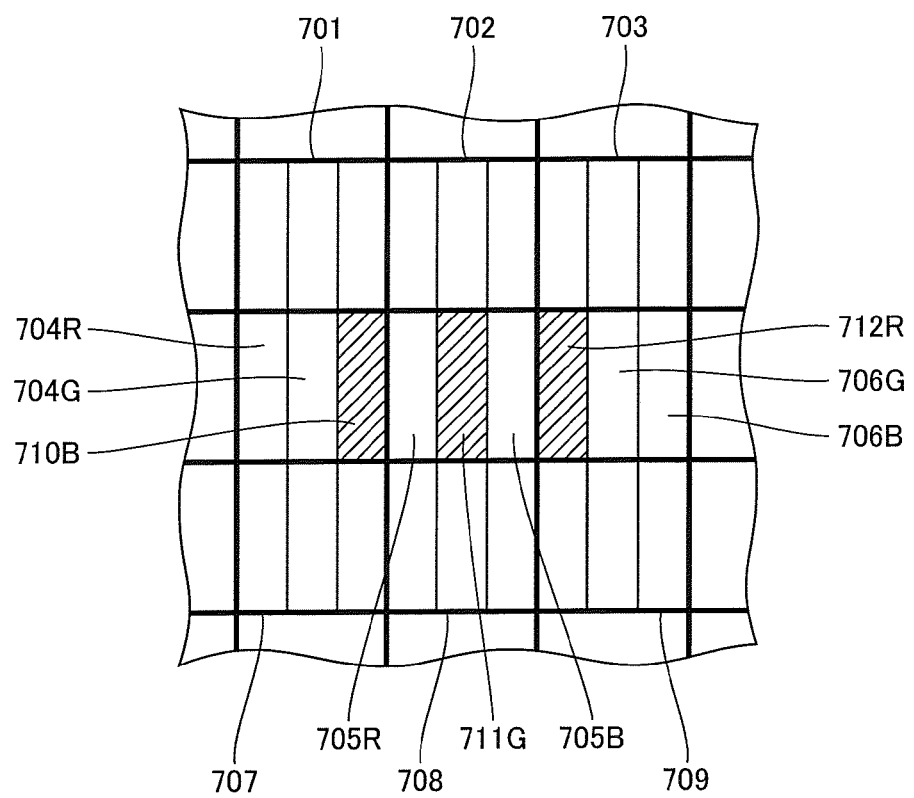
FIG. 19 depicts an array of pixels to be visually recognized by the viewer wearing polarization glasses.

FIG. 19 depicts the array of pixels that the viewer wearing polarization glasses 4B visually recognizes. With reference to FIG. 19, for the viewer wearing polarization glasses 4B, pixel 710B looks like being interposed between pixel 704G and pixel 705R. In addition, pixel 711G looks like being interposed between pixel 705R and pixel 705B. Moreover, pixel 712R looks like being interposed between pixel 705B and pixel 706G.

Even in the case where the arrangement of right-eye pixels is defined as depicted in FIG. 18, increase in emission loss is preventable in image display apparatus 1B even with a larger value of ratio of luminance between the left-eye image and the right-eye image, as in the case of the arrangement of the right-eye pixels depicted in FIG. 16.

Fourth Embodiment

Still another embodiment of the present invention is described with reference to FIGS. 20 to 23. In the present embodiment, the image display apparatus performs control such that at least one of the pixels constituting the left-eye image is a pixel brighter than any of the pixels constituting the right-eye image, in one frame.

Figure 20:
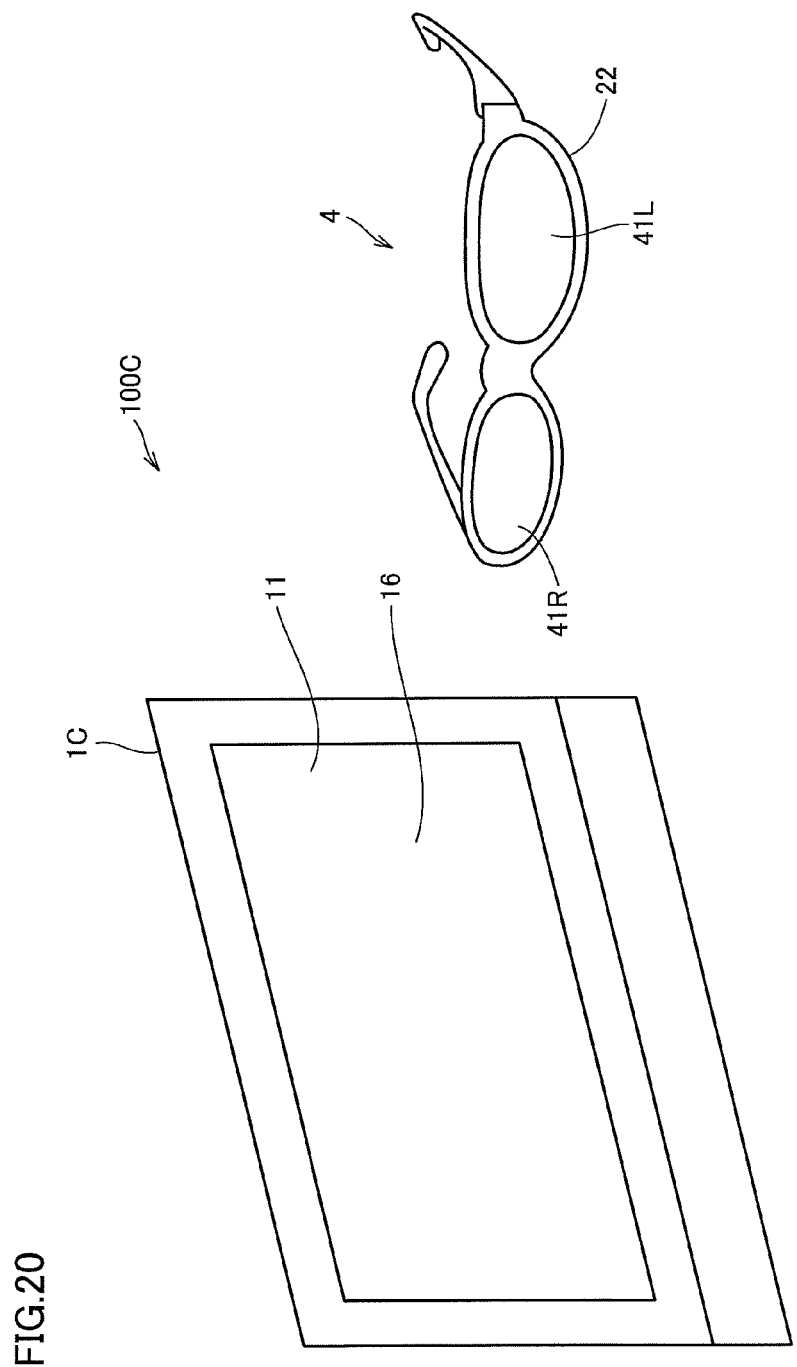
FIG. 20 depicts a schematic configuration of a three-dimensional image display system according to still another embodiment.

FIG. 20 depicts a schematic configuration of a three-dimensional image display system 100C. With reference to FIG. 20, three-dimensional image display system 100C includes an image display apparatus 1C and polarization glasses 4.

Figure 21:
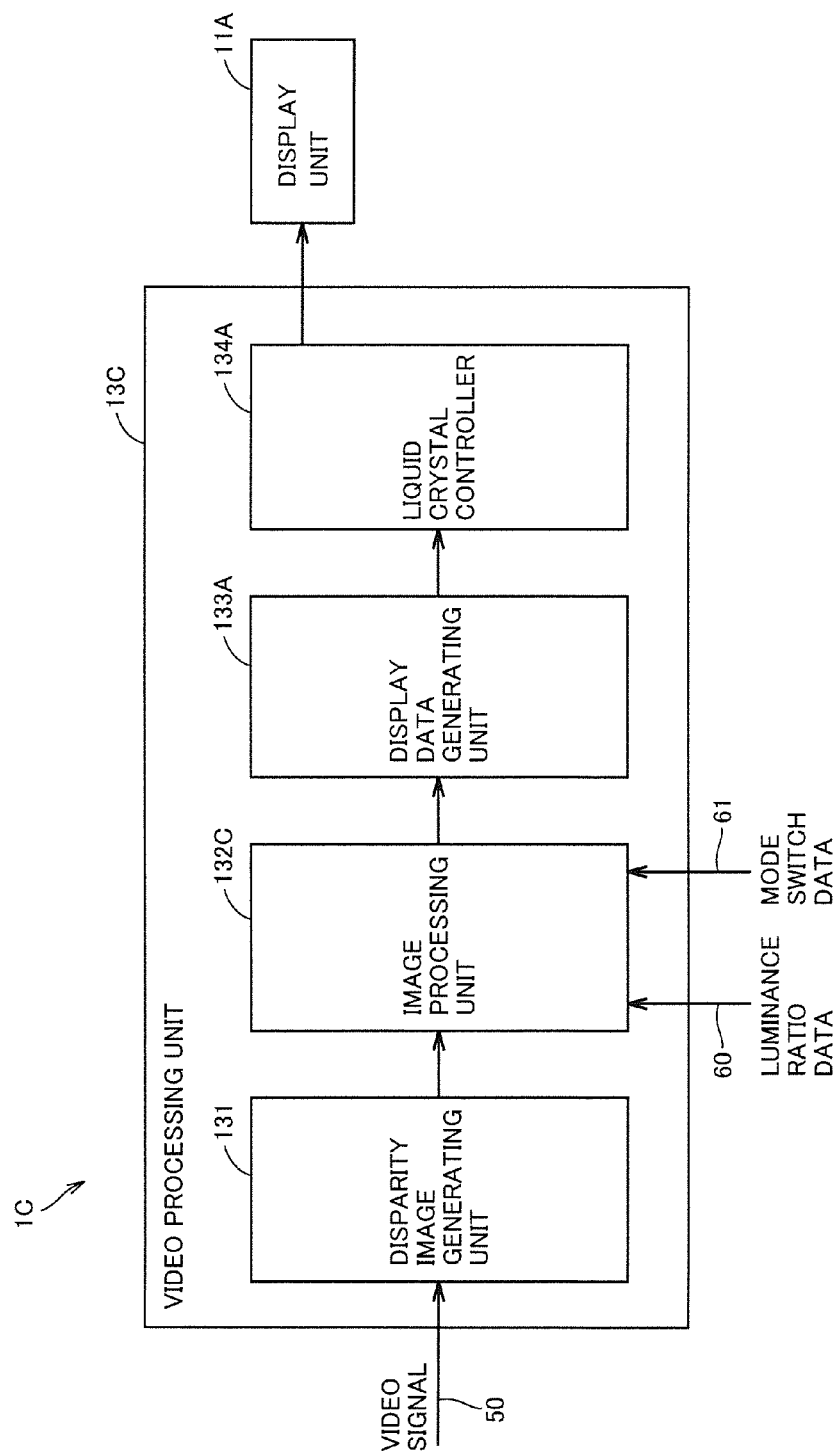
FIG. 21 is a block diagram depicting a functional configuration of an image display apparatus.

FIG. 21 is a block diagram depicting a functional configuration of image display apparatus 1C. With reference to FIG. 21, image display apparatus 1C includes a video processing unit 13C and display unit 11A. Video processing unit 13C includes disparity image generating unit 131, and an image processing unit 132C, display data generating unit 133A, and liquid crystal controller 134A. Image display apparatus 1C adopts RGB color model.

Thus, image display apparatus 1C of the present embodiment is different from image display apparatus 1A (see FIG. 11) of the second embodiment including image processing unit 132 in that image processing unit 132C is included.

Figure 22:
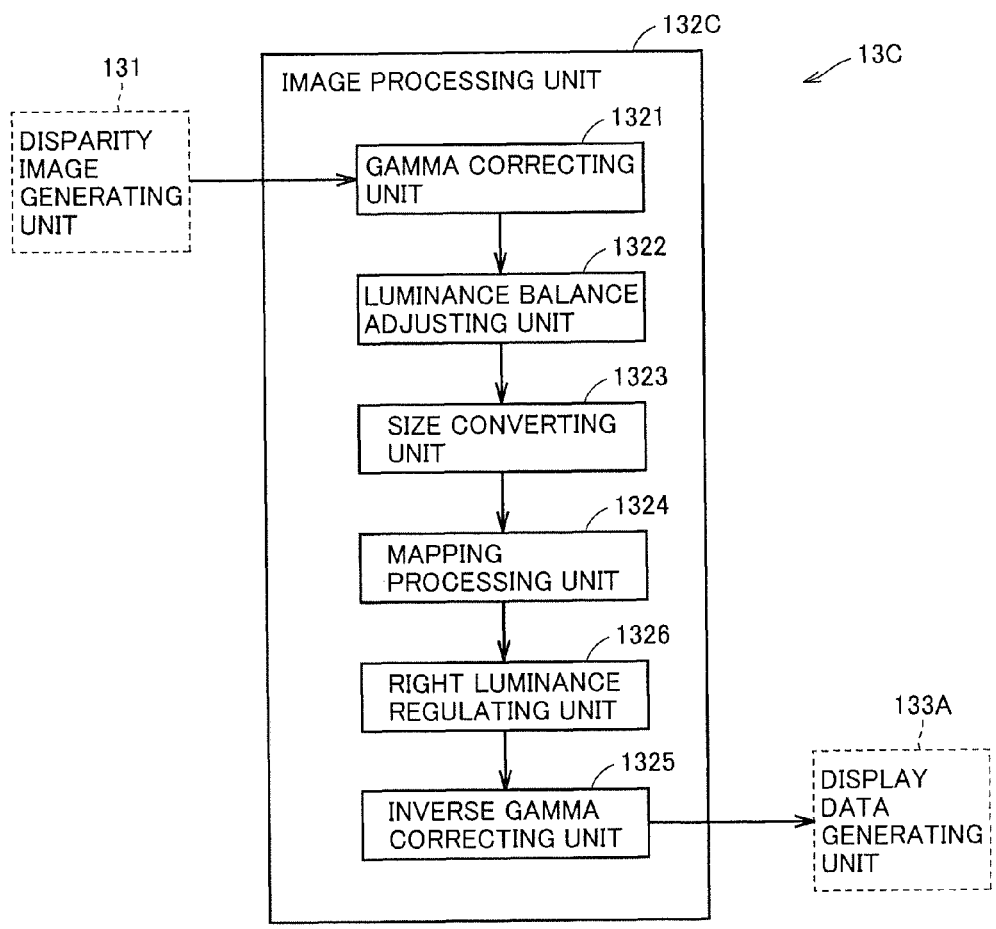
FIG. 22 depicts a configuration of an image processor.

FIG. 22 depicts a configuration of image processing unit 132C. With reference to FIG. 22, image processing unit 132C includes gamma correcting unit 1321, luminance balance adjusting unit 1322, size converting unit 1323, mapping processing unit 1324, a right luminance regulating unit 1326, and an inverse gamma correcting unit 1325. Specifically, image processing unit 132C is different from image processing unit 132 (see FIG. 4) in that right luminance regulating unit 1326 is included.

Description is given below of right luminance regulating unit 1326. Right luminance regulating unit 1326 accepts data outputted from mapping processing unit 1324 and performs processing on the data. Right luminance regulating unit 1326 sends the processed data to inverse gamma correcting unit 1325.

In the following, the element that has been distributed/to be distributed to subpixels constituting luminance is referred to as a "luminance component". The "luminance" specifically indicates brightness defined by signals, and brightness that humans perceive. In other words, the "luminance component" represents luminance in the form of a component, which luminance is divided intentionally by the designer of the image display apparatus. Hence, luminance components may agree with the luminance in some cases and do not agree in other cases. While the details are described below, image display apparatus 1C and image display apparatus 1D to be described later decide luminance components to be distributed to pixels in compliance with a predefined rule according to the luminance for display, and allocates the decided luminance components to the pixels. The pixels each exhibit set luminance.

Right luminance regulating unit 1326 decides the luminance components of the pixels constituting the left-eye image and the luminance components of the pixels constituting the right-eye image by frame according to the following rule: Right luminance regulating unit 1326 sets the luminance components of the pixels such that the brightest pixel is a constituent pixel of the left-eye image when comparison of constituent pixels are made between the left-eye image and the right-eye image corresponding to a pair of 3-D signals. More specifically, right luminance regulating unit 1326 allocates luminance components to the pixels contained in a unit pixel group such that the brightest pixel is a constituent pixel of the left-eye image when comparison is made between the pixels of the left-eye image and the pixels of the right-eye image contained in any of the unit pixel groups (see, for example, FIG. 7).

To carry out the above rule, right luminance regulating unit 1326 performs the following processes A to E in this order until the brightest pixel becomes a constituent pixel of the left-eye image as described above. In other words, when, for example, the brightest pixel has become a constituent pixel of the left-eye image by the following processes A and B, right luminance regulating unit 1326 does not have to perform the following processes C, D, and E.

Process A: First, right luminance regulating unit 1326 non-uniformly performs luminance allocation on the pixels constituting the left-eye image per unit pixel group. Such a process is performed so as to induce occurrence of a brighter pixel in the pixels constituting the left-eye image.

Process B: Second, right luminance regulating unit 1326 uniformly performs luminance allocation on the pixel constituting the right-eye image per unit pixel group. Such a process is performed so as not to induce occurrence of a brighter pixel in the pixels constituting the right-eye image.

Process C: Third, right luminance regulating unit 1326 places a priority ranking to each pixel constituting the left-eye image per unit pixel group and decides the luminance components of the pixels contained in the unit pixel group based on the priority ranking. Such a process is performed so as for the left-eye image to contain brighter pixels at all times.

Process D: Fourth, right luminance regulating unit 1326 allocates the luminance components such that the luminance component of the pixel having the highest priority ranking in each unit pixel group has a value greater than or equal to three times higher, i.e., the value of ratio of greater than or equal to 3, the luminance component of the pixel having the second highest priority ranking. Such a process is performed so as to guarantee the continuity of tones involving allocation of luminance. It is to be noted that an excessively large value of the ratio tends to incur discontinuity of tones (luminance characteristic) at an instant where a priority pixel turns to another one according to change of frames. In addition, an insufficient value of the ratio may cause instability in occurrence of satisfactorily bright pixels.

Process E: Fifth, in the case where the rule is not achieved even when the processing based on processes A to D is carried out, the luminance of a pixel constituting the right-eye image, which pixel is higher in luminance than the constituent pixel having the highest luminance of the left-eye image, is brought to conform to the luminance of the pixel with the highest luminance, per unit pixel group.

Next, description is given of an effect obtained when the above processes are performed by image display apparatus 1C. It was found that human beings have a function of extracting and recognizing a luminance component with a large contrast by means of sense of vision. More specifically, on the basis of the unit pixel groups, in the case where the luminance of one pixel (hereinafter also referred to as a "specific pixel") of the pixels constituting the right-eye image is higher than the luminance of any of the pixels constituting the left-eye image in the periphery of the specific pixel, even when the right-eye image is dark upon averaging of luminance of the peripheral pixels constituting the right-eye image, human beings extract and recognize the pixel of maximum luminance. This is inferable also from the fact that, with a display apparatus on which a micro bright spot is displayed, human beings easily recognize the bright spot even when the screen of the display apparatus has a small display area and involves a small total light quantity. On occurrence of such a condition, the user who does not wear polarization glasses 4 recognizes a right-eye image in the area including the specific pixel despite the right-eye image having suppressed total luminance. For this reason, crosstalk occurs in viewing a 2-D image with naked eyes.

Image display apparatus 1C is suitably a display device with a relatively high definition. This is because, being unable to be recognized independently, pixels other than the pixel of the maximum luminance can be discussed as the total luminance. In other words, the luminance represented by individual pixels is dealt as luminance components of a pixel group.

As described above, at least one of the pixels constituting the left-eye image may be set as a pixel that is brighter than any of the pixels constituting the right-eye image by right luminance regulating unit 1326, in one frame. Thus, the user viewing the screen of image display apparatus 1C with naked eyes mainly recognizes the left-eye image at all times. Hence, the user is able to see favorable two-dimensional images.

Figure 23:
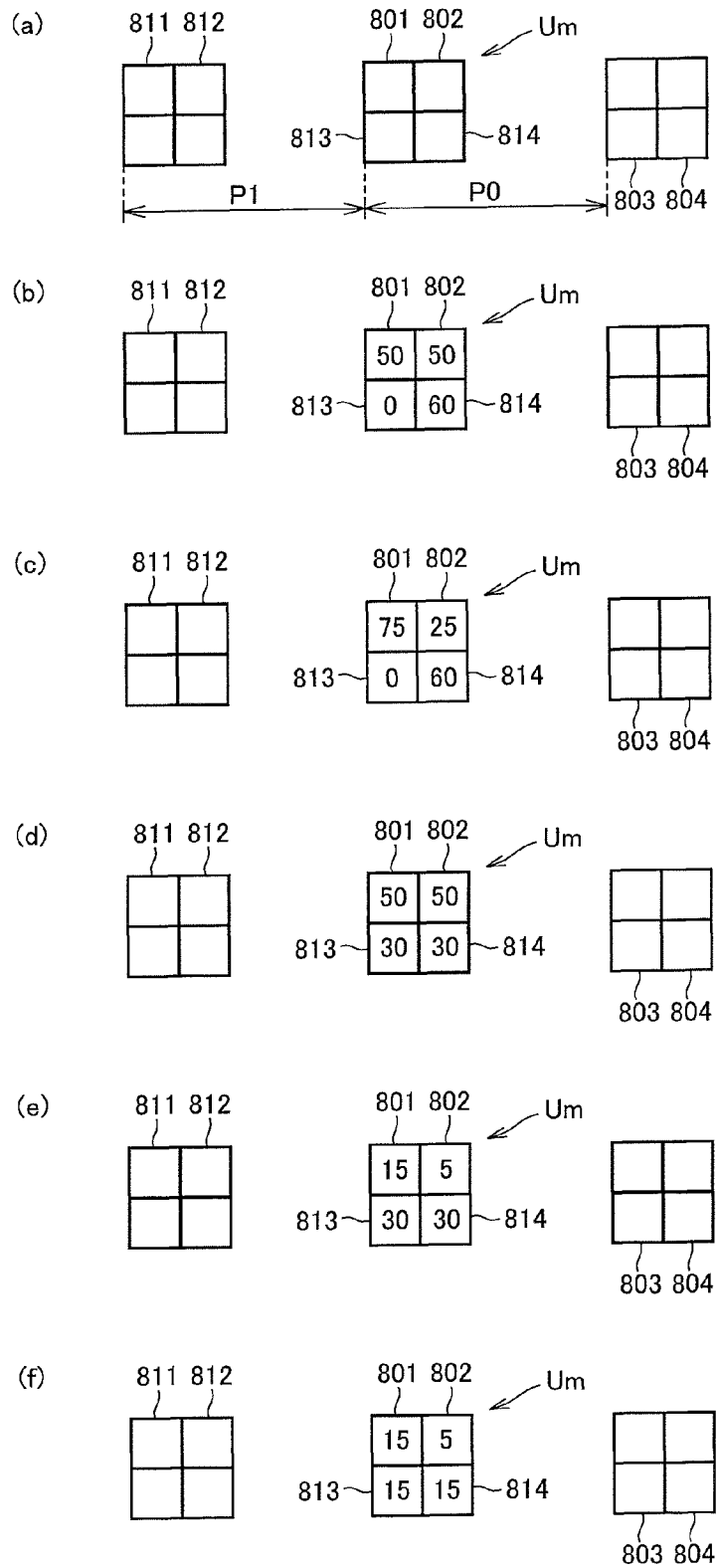
FIG. 23 is an explanatory diagram of a specific example of processing at a right luminance regulating unit.

FIG. 23 is an explanatory diagram of a specific example of the processing at right luminance regulating unit 1326. In the following, description is made of an example in which the unit pixel group is constituted by four pixels. FIG. 23 (*a*) is an explanatory diagram of a unit pixel group Urn. With reference to FIG. 23 (*a*), pixels 801 and 802 are left-eye pixels, and pixels 803 and 804 are right-eye pixels. Similarly, pixels 811 and 812 are left-eye pixels, and pixels 813 and 814 are right-eye pixels. These pixels for either eye are positionally shifted in the horizontal direction by a distance P0 or P1 according the disparity.

For the user wearing polarization glasses 4, pixels 801, 802, 803, and 804 are observed approximately at the same position with a sense of depth, and pixels 811, 812, 813, and 814 are observed approximately at the same position likewise. When viewed with naked eyes, pixels 801 and 802 and pixels 803 and 804 are observed at position shifted from one another, and pixels 801, 802, 813, and 814 are naturally observed at approximately the same position.

In the following, description is made with pixels 801, 802, 813, and 814 considered as a unit pixel group Urn. Specifically, unit pixel group Um is constituted by four pixels 801, 802, 813, and 814. In the following, description is exemplarily made of a case in which the ratio of luminance between the left-eye image and the right-eye image is 5:3 with respect to the unit pixel group Um.

FIG. 23 (*b*) depicts a comparative example for allocation of luminance to pixels 801, 802, 813, and 814. With reference to FIG. 23 (b), luminance is allocated to pixels 801 and 802 such that the luminance components are both "50". Pixel 814 is allocated with luminance such that the luminance component is "60" and pixel 813 is not allocated with luminance. In this case, right-eye pixels have larger luminance components than left-eye pixels in the unit pixel group Um. Hence, in this case, if a left-eye pixel having a luminance component of greater than or equal to "60" does not exist in the other unit pixel group in the same frame, crosstalk occurs in viewing the 2-D image with naked eyes as described above.

FIG. 23 (c) is an explanatory diagram of a case in which the process A is performed. With reference to FIG. 23 (c), pixel 801 is allocated with luminance such that the luminance component thereof is "75" and pixel 802 is allocated with luminance such that the luminance component thereof is "25". That is, right luminance regulating unit 1326 non-uniformly performs luminance allocation on the pixels constituting the left-eye image in the unit pixel groups Um. Pixel 814 is allocated with luminance such that the luminance component thereof is "60" and pixel 813 is not allocated with luminance. Through such non-uniform allocation, in the unit pixel groups Um, the right-eye pixels have smaller luminance components than the left-eye pixels. Thus, right-eye pixels with higher luminance component than the left-eye pixels are prevented from being produced in one frame.

It is preferred that the non-uniform allocation (ratio) be defined in advance to a fixed value in image display apparatus 1C. For example, an exemplary value of the ratio is 3:1. Needless to say, the ratio is not limited thereto.

FIG. 23(d) is an explanatory diagram of a case in which the process B is performed. With reference to FIG. 23(d), pixels 801 and 802 are allocated with luminance such that the luminance components thereof are "50". Pixels 813 and 814 are allocated with luminance such that the luminance components thereof are "30". That is, right luminance regulating unit 1326 allocates luminance evenly to the pixels constituting the right-eye image in the unit pixel group Um. Specifically, pixels 813 and 814 constituting the right-eye image are prevented from being brighter. Through such even allocation, in the unit pixel group Um, the right-eye pixels have smaller luminance components than the left-eye pixels. Thus, a right-eye pixel with a larger luminance component than the left-eye pixels is prevented from being produced in one frame.

FIG. 23 (e) depicts a condition in which, even through the processes A to D were performed, a right-eye pixel has a larger luminance component than the left-eye pixels in a unit pixel group Um. With reference to FIG. 23 (e), description is made of such a case. With reference to FIG. 23 (e), pixel 801 is allocated with luminance such that the luminance component thereof is "15", and pixel 802 is allocated with luminance such that the luminance component thereof is "5". Pixel 813 is allocated with luminance such that the luminance component thereof is "30", and pixel 814 is allocated with luminance such that the luminance component thereof is "30".

FIG. 23 (f) is an explanatory diagram of a case in which the process E is performed. With reference to FIG. 23 (f), right luminance regulating unit 1326 brings the luminance components of right-eye pixels 813 and 814 to conform to the luminance component of pixel 801 that has the larger luminance component of left-eye pixels 801 and 802. Specifically, right luminance regulating unit 1326 sets the luminance components of pixels 813 and 814 to "15". Through such allocation, in the unit pixel group Um, the luminance component of the right-eye pixel is unlikely to be larger than the luminance component of the left-eye pixel. Thus, a right-eye pixel having a larger luminance component than the left-eye pixel is suppressed from being produced in one frame.

In addition, effects obtained from the process E are described. According to a simple logic, in an image treated with process E, luminance balance between the right-hand image and the left-hand image deviates from that intended with the signals to be inputted to video processing unit 13C, and hence display of a 3-D image is unlikely to be achieved. However, as a result of continuous study on visibility of 3-D images, it has been found that a kind of stabilizing rule exists in display of 3-D images.

The stabilizing rule is such that, to put it simply, an image with which the user once feels a stereoscopic effect looks three-dimensionally for a relatively long period of time. If any of actions or operations such as (i) closing either eye; (ii) turning off an image for either eye; (iii) decimating an image for either eye randomly; or (iv) tilting an image, the user is unable to recognize the displayed image as a 3-D image.

However, it was found that, after the user actually recognizes a 3-D image, any of operations such as (i) erasing an image for either eye once in every three frames; or (ii) erasing approximately one dot of ten dots randomly in an image for either eye does not cause significant change in degree of the user's recognition of 3-D images. As such, confirmation was made of stability of recognition of 3-D images based on the characteristics of human consciousness and vision.

This stability has a correlation with the time axis and spatial axis. Hence, even in the case where a right-eye pixel has a larger luminance component than the left-eye pixels despite the processes A to D and thus the process E is performed to correct the luminance of the right-eye pixels, the user is able to visually recognize favorable 3-D images.

Meanwhile, in viewing 2-D images, the stability as described above rarely exists. That is, when there exists a pixel with a conspicuously large luminance component as compared with the peripheral pixels, the user recognizes that pixel preferentially. The stability in observation of 2-D images is achievable only by decimation of an image. Since the area with missing data is treated with an appropriate interpolation process, a side effect of reduction in luminance is unlikely to occur in of the right-eye image at the time of viewing 2-D images.

Hence, image display apparatus 1C achieves more stable display of 2-D images as compared with the second embodiment and also allows for display with little affect on display of 3-D images.

Fifth Embodiment

Still another embodiment of the present invention is described with reference to FIGS. 24 to 27. In the present embodiment, an image display apparatus performs control such that, per unit pixel group, the luminance components of the pixels constituting the right-eye image is subtracted from the luminance components of the remaining pixels of the pixels constituting the left-eye image with the pixel of maximum luminance excluded. In the present embodiment, the control enables the naked-eye user to visually recognize 2-D images with better visibility as compared with the fourth embodiment.

Figure 24:
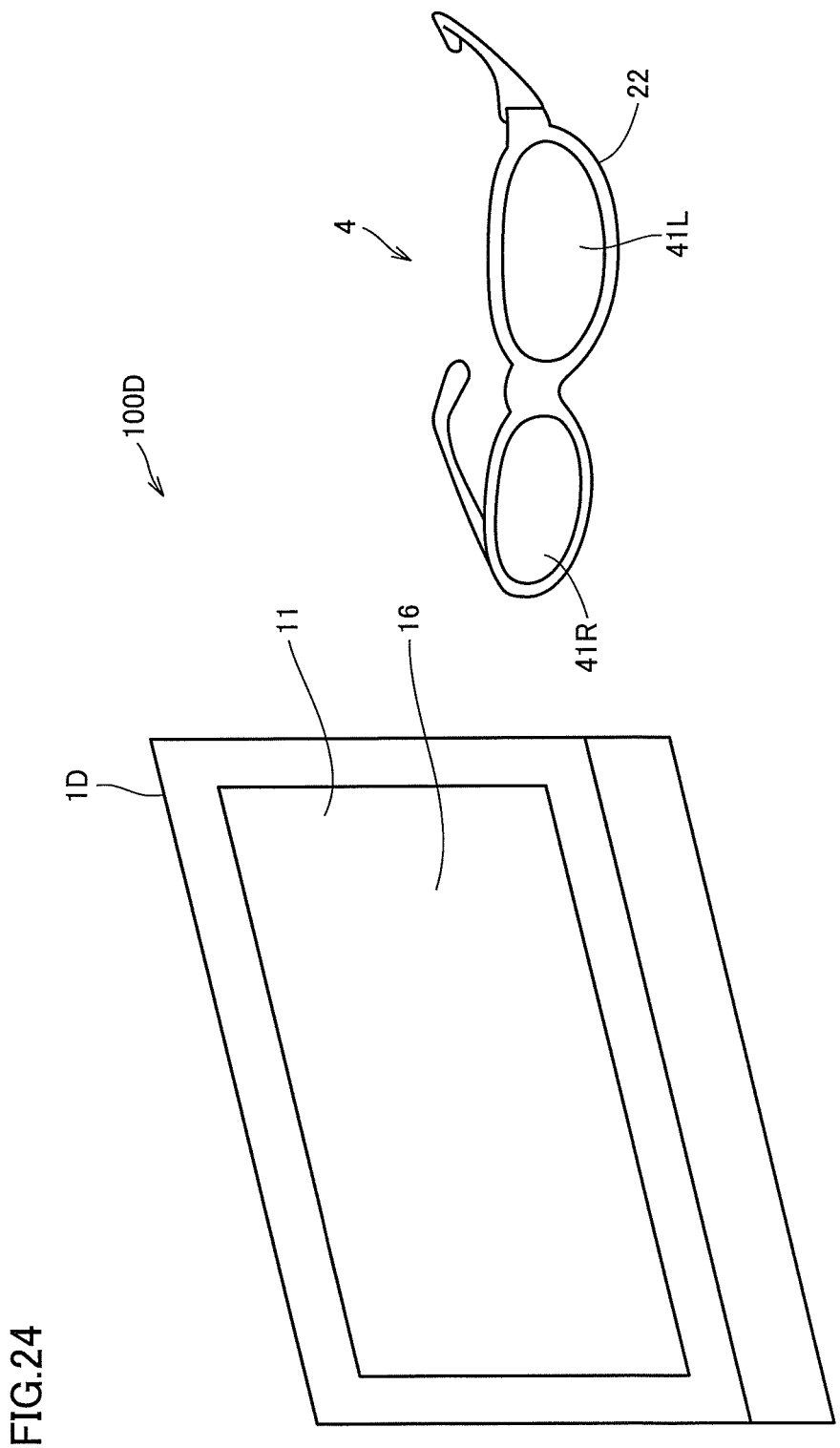
FIG. 24 depicts a schematic configuration of a three-dimensional image display system according to still another embodiment.

FIG. 24 depicts a schematic configuration of a three-dimensional image display system 100D. With reference to FIG. 24, three-dimensional image display system 100D includes an image display apparatus 1D and polarization glasses 4.

Figure 25:
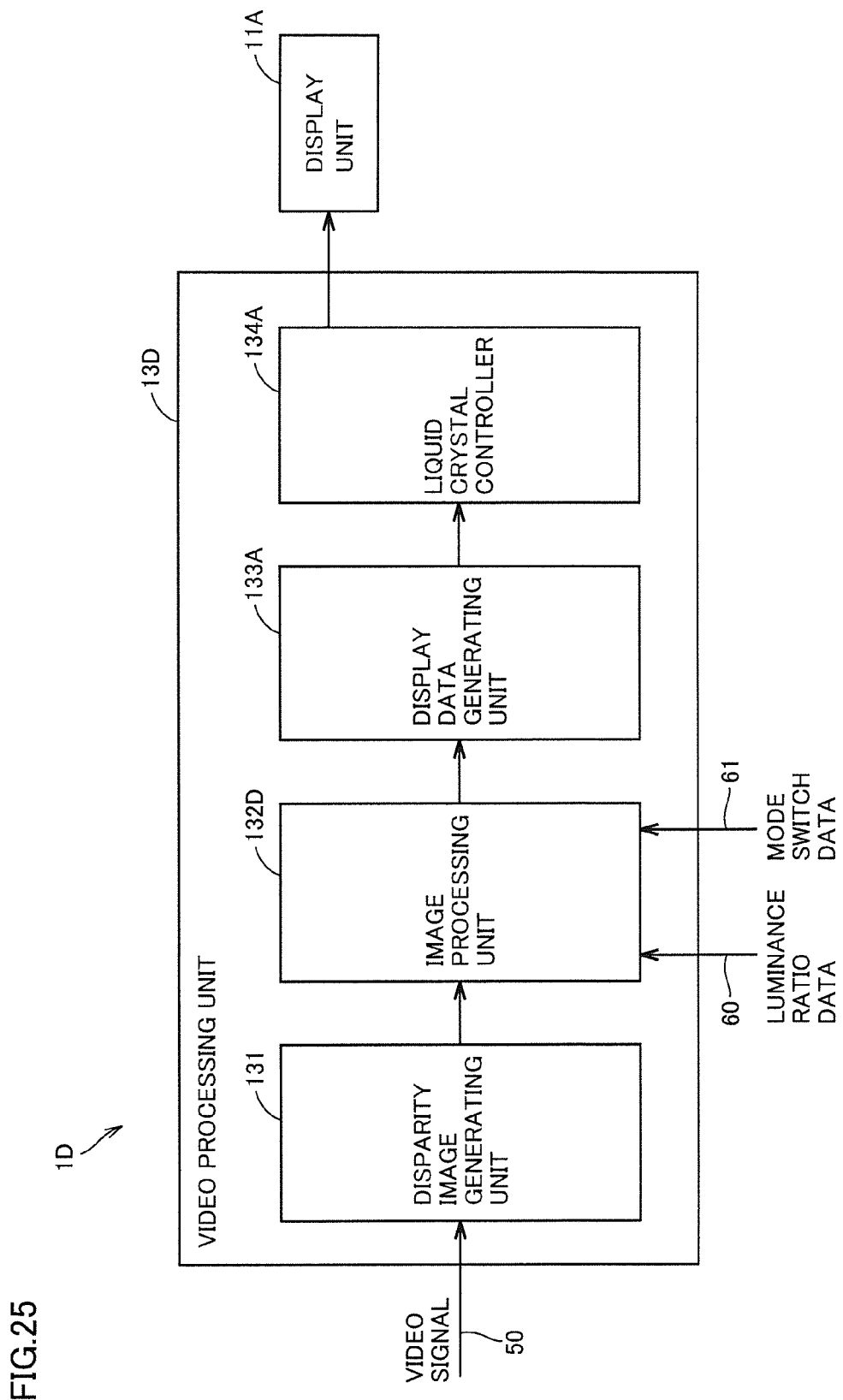
FIG. 25 is a block diagram depicting a functional configuration of an image display apparatus.

FIG. 25 is a block diagram depicting a functional configuration of image display apparatus 1D. With reference to FIG.

25, image display apparatus 1D includes a video processing unit 13D and display unit 11A. Video processing unit 13D includes disparity image generating unit 131, an image processing unit 132D, display data generating unit 133A, and liquid crystal controller 134A. Image display apparatus 1D adopts RGB color model.

Thus, image display apparatus 1D of the present embodiment is different from image display apparatus 1C (see FIG. 21) of the fourth embodiment including image processing unit 132C in that image processing unit 132D is included.

Figure 26:
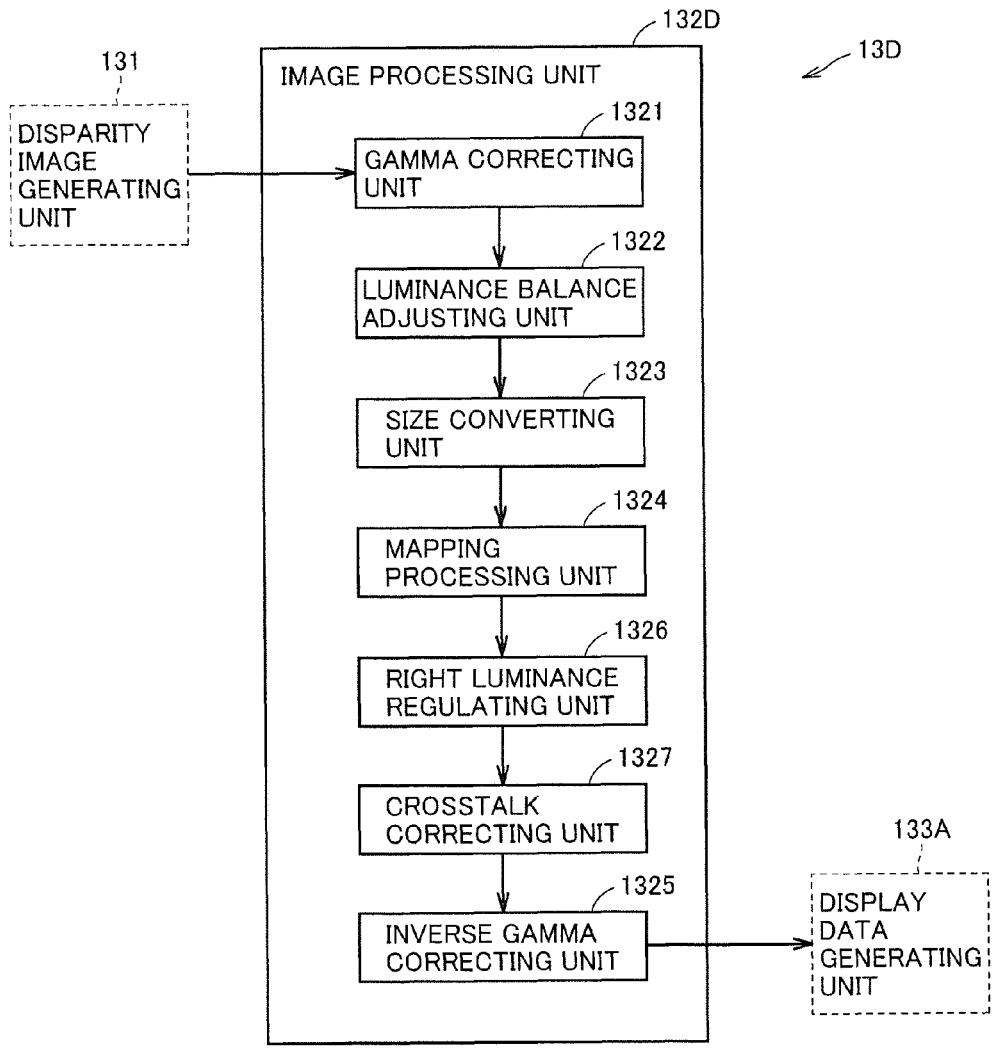
FIG. 26 depicts a configuration of an image processing unit.

FIG. 26 depicts a configuration of image processing unit 132D. With reference to FIG. 26, image processing unit 132D includes gamma correcting unit 1321, luminance balance adjusting unit 1322, size converting unit 1323, mapping processing unit 1324, right luminance regulating unit 1326, a crosstalk correcting unit 1327, and inverse gamma correcting unit 1325. That is, image processing unit 132D is different from image processing unit 132C (see FIG. 22) in that crosstalk correcting unit 1327 is included.

Crosstalk correcting unit 1327 is described below. Crosstalk correcting unit 1327 accepts data outputted from right luminance regulating unit 1326 and performs processing on the data. Crosstalk correcting unit 1327 sends the processed data to inverse gamma correcting unit 1325.

Crosstalk correcting unit 1327 subtracts, per unit pixel group, the luminance components of the pixels constituting the right-eye image from the luminance components of the remaining pixels of the pixels constituting the left-eye image with the pixel of maximum luminance excluded, with respect to the image data to which luminance is allocated at right luminance regulating unit 1326.

FIG. 27 is an explanatory diagram of an example of processing of crosstalk correcting unit 1327. In the following also, description is made of an example in which the unit pixel group is constituted by four pixels.

FIG. 27 (*a*) is an explanatory diagram of a unit pixel group Un. More specifically, FIG. 27 (*a*) depicts a unit pixel group Un prior to the subtraction process. In other words, FIG. 27 (*a*) depicts a unit pixel group Un outputted from right luminance regulating unit 1326.

With reference to FIG. 27 (*a*), pixels 901 and 902 are left-eye pixels, and pixels 903 and 904 are right-eye pixels. Similarly, pixels 911 and 912 are left-eye pixels, and pixels 913 and 914 are right-eye pixels. These pixels for both eyes are shifted from one another horizontally by a distance P0 or a distance P1 according to the disparity.

For the user wearing polarization glasses 4, pixels 901, 902, 903, and 904 are perceived at approximately the same position with a sense of depth, and pixels 911, 912, 913, and 914 are perceived at approximately the same position, similarly. With the observation by naked eyes, pixels 901 and 902 are observed at positions shifted from the positions of pixels 903 and 904, and pixels 901, 902, 913, and 914 are naturally observed at approximately the same position.

In the following, pixels 901, 902, 913, and 914 are described as a unit pixel group Un. In other words, the unit pixel group Un is constituted by four pixels 901, 902, 913, and 914. In the following, a case is exemplarily described in which the ratio of luminance between the left-eye image and the right-eye image is 4:1 for the unit pixel group Un.

With reference to FIG. 27 (*a*), the unit pixel group Un is constituted by four pixels 901, 902, 913, and 914. Pixels 901 and 902 are left-eye pixels, and pixels 913 and 914 are right-eye pixels. Pixel 901 has a luminance component of "60" and pixel 902 has a luminance component of "20". Pixels 913 and 914 have a luminance value of "10".

Such allocation of luminance results from, for example, processes A and B described in connection with the fourth embodiment. Alternatively, the allocation of luminance results from, for example, the processes A to D. In the following, pixel 901 with a larger luminance component of right-eye pixels 901 and 902 is also referred to as a "preferential pixel".

FIG. 27 (*b*) is an explanatory diagram of a unit pixel group Un subsequent to the process of subtraction process. With reference to FIG. 27 (*b*), crosstalk correcting unit 1327 subtracts the luminance component of pixel 913 (or the luminance component of pixel 914) from the luminance component of pixel 902. As result, the luminance component of pixel 902 makes "10". Since the luminance value of pixel 902 is not "0" yet, the processing is further proceeded.

FIG. 27 (*c*) is an explanatory diagram of a unit pixel group Un subsequent to the process of further subtraction. With reference to FIG. 27 (*c*), crosstalk correcting unit 1327 subtracts the luminance component of pixel 914 (or the luminance component of pixel 913) from the luminance component "10" of pixel 902. As a result, the luminance component of pixel 902 becomes "0". The subtraction process by crosstalk correcting unit 1327 with respect to the unit pixel group Un is terminated here.

As has been described, crosstalk correcting unit 1327 subtracts, in a unit pixel group Un, the luminance component(s) of pixels 913 and/or 914 constituting the right-eye image from the luminance component of the remaining pixel 902 of pixels 901 and 902 constituting the left-eye image with pixel 901 of maximum luminance excluded, as much as possible. In the case where a negative value is given by subtracting the sum of luminance components of pixels 913 and 914 (hereinafter also referred to as "a total luminance component R") from the luminance component of the remaining pixel 902, the luminance component of pixel 902 after the subtraction is set to "0". In the following, the sum of the luminance components of pixels 901 and 902 is also referred to as a "total luminance component L".

Such a process is executed by crosstalk correcting unit 1327 for the following reasons:

In the case where the luminance component (a crosstalk component) originating from a right-eye image is subtracted from a left-eye image in high definition display at a degree where the luminance components of pixels are inseparable, the luminance of the right-eye image is varied. For this reason, performing subtraction of luminance components without a certain rule may impair the stability of three-dimensional image display. While in the fourth embodiment, description has already been given that processes such as the above-described processes A and C achieve favorable 2-D image visibility, it was also found that a subtraction process enabling stable recognition of 3-D images also exists with respect to 3-D images. That process is the above-described process to be performed by crosstalk correcting unit 1327.

More detailed description is given below. In the left-eye pixels of a unit pixel group Un, the pixel with a larger luminance component is also referred to as a "preferential pixel" and the pixel with a smaller luminance component as a "non-preferential pixel".

Exemplary techniques of subtraction of the total luminance component R include the following two.

Technique A: The total luminance component R ("20") is subtracted from the luminance component "20" of pixel 902. In this case, the luminance component of pixel 901 and the luminance component of pixel 902 add up to 60 (=60+0).

Technique B: The total luminance component R ("20") is subtracted from the luminance component "60" of pixel 901.

In this case, the luminance component of pixel 901 and the luminance component of pixel 902 add up to 60 (=40+20).

As is described, in either case of using technique A or B, the same value is obtained by the summing of the luminance component of pixel 901 and the luminance component of pixel 902. Further, in either case using either technique A or B, drastic improvement is achieved with respect to crosstalk. Both techniques A and B provide for a similar degree of visibility for two-dimensional image display.

In addition, when a 3-D image is viewed with polarization glasses with the left-eye transmittance of ¼, the same value is given for the ratio between the luminance component of the image to be visually perceived with the left eye and the luminance component of the image to be visually perceived with the right eye either by technique A or B as follows:

In the case of technique $A$:Left:Right=15(=60/4+0/4):20

In the case of technique $B$:Left:Right=15(=40/4+20/4):20

It was however found that using technique A allows for more stable visibility of 3-D images than using technique B. Both techniques A and B make the same ratio between the left and the right. Hence, it is speculated that the user is apt to prefer technique A due to perceptive and psychological factors. Specifically, after passing through the polarization glasses, the total luminance component L should be "20 (=(60+20)/4)" originally but is reduced to "15"; this is probably because the allocation of luminance by technique A involving higher non-uniformity enhances visibility of 3-D images.

Moreover, in the case where the total luminance component R is subtracted from the luminance component of the non-preferential pixel, a negative value may be given as a result of the subtraction. In this case, it is also considered that subtraction of luminance component be also conducted from the luminance component of the preferential pixel. For example, in the case where the luminance component of the non-preferential pixel is "20", the luminance component of the preferential pixel is "60", and the total luminance component R is "30", it is considered that the luminance component of the non-preferential pixel is set to "0", and that the luminance component of the preferential pixel is set to "50 (=60−(30−20))" (hereinafter also referred to as "technique "C"). Meanwhile, also considered is a technique wherein subtraction is not conducted from the preferential pixel (hereinafter referred to as "technique D"). As a result of comparison between techniques C and D, it was found that technique D is more favorable than technique C in terms of stability of 3-D images.

As a result of the above, it was found that the above-described processes by crosstalk correcting unit 1327 are preferably performed.

The following realization is further given based on the description with reference to FIG. 27. Pixel 902 does not have to be used by the user to trace visually the shape of a 2-D image. Pixels 913 and 914 do not have to be used to represent the color of a 2-D image. However, pixels 913 and 914 are used for the user to recognize a 3-D image.

Originally, for the user viewing a 2-D image with naked eyes, the grand sum of the luminance components in a unit pixel group Un has only to be the total luminance component L of "80 (=60+20)". However, the grand sum of the luminance components in the unit pixel group Un is "100 (=80+20)". Specifically, for the user to visually recognize the 2-D image, the luminance component is higher by "20" than a preferred luminance component.

Thus, in image display apparatus 1D, the total luminance component R is subtracted from the non-preferential pixel by crosstalk correcting unit 1327 described above, so as to maintain the stability of 3-D images and also to enhance visibility of 2-D images.

In the foregoing embodiments, description has been exemplarily given of configuration in which the left-eye image has higher luminance than the right-eye image. The embodiments are however not given for restrictive purpose, and it may also be so configured that the right-eye image has higher luminance than the left-eye image. In this case, the left portions and right portions of shutter glasses 2 and polarization glasses 4 may be switched in structure of 4 and 4B according to the replacement of the configuration.

The above-described configurations and processes of the display apparatuses may be partly taken and summed up as follows:

Image display apparatuses 1A, 1B, 1C, and 1D each include a plurality of pixels and display a left-eye image and a right-eye image constituting one three-dimensional image within one frame period. The pixels belong to any of a plurality of pixel groups (unit pixel groups). The pixel groups each include as the above pixels a first pixel, e.g., pixels 501 and 502 of FIG. 7, and a second pixel, e.g., pixels 523 and 524 of FIG. 7.

The above image display apparatuses each include a polarization filter layer 16 for polarizing light emitted from the first pixel into light with a first polarization characteristic and for polarizing light emitted from the second pixel into light with a second polarization characteristic. The image display apparatuses include image processing units 132, 132B, 132C, and 132D for setting the luminance of at least one of the luminance of the left-eye image and the luminance of the right-eye image such that the luminance of a predefined first image of the left-eye image or the right-eye image (the left-eye image in the foregoing embodiments) is higher than the luminance than a second image (the right-eye image in the foregoing embodiments) of the images. The image display apparatuses include display controllers (display data generating units 133A and 133B and liquid crystal controller 134A) for causing the first pixel to render the first image at the set luminance and causing the second pixel to render the second image at the set luminance.

In displaying the three-dimensional image, the image processing units preferably set the luminance of the first image to have a value greater than or equal to double and less than or equal to eight times the luminance of the second image.

The image display apparatuses thus configured allow for visual recognition of images with less uncomfortable feeling to those who see the screen without using three-dimensional image viewing glasses.

(1) For example, the image display apparatuses are a liquid crystal display apparatus with a direct field of vision. The image display apparatuses may be a projector as described above.

(2) The polarization method of the image display apparatuses is the linear polarization. The left polarization axis and the right polarization axis are substantially orthogonal to each other. The circular polarization may also be adopted as the polarization method instead of the linear polarization. In this case, the left polarization surface and the right polarization surface are positioned to be reversely rotated from one another.

Comparing the linear polarization method and the circular polarization method, the linear polarization method has an advantage in terms of cost by a retarder being dispensed with while being liable to crosstalk due to, for example, deviation in angle of polarization axis of the glasses depending on the action of the viewer. Specifically, in an aspect as in a theater or a monitor room where the viewer's action is specifiable to a certain degree, the linear polarization method is cost-effective, whereas in an aspect as at general household where the viewing conditions are not known, the circular polarization method is comparatively safer: Those who practice the embodiments may make appropriate selection in consideration of these effects.

(3) In the case where three-dimensional images are displayed by using the above image display apparatuses, the polarization glasses for use in visual recognition of the three-dimensional images may be configured as follows: The polarization glasses may be configured such that one of the lenses, e.g., the left-eye lens, for use in visual recognition of the first image has concentration of a pigment (dye) to be added thereto that is higher than the concentration of a pigment (dye) to be added to the other of the lenses, e.g., the right-eye lens. Alternatively, the polarization glasses may be configured such that a neutral density filter is applied to or included in either of the lenses.

(4) In the case where three-dimensional images are displayed by using the above image display apparatuses, the shutter glasses for use in visual recognition of the three-dimensional images may be configured, for example, as follows: A time sequential shutter may be provided in either of the lenses, so as to control the transmittance by the operation of the shutter. Alternatively, time sequential shutter may be provided in both of the lenses, such that the opening period of the shutter of one of the lenses is shorter than the opening period of the shutter for the other lens.

While either the polarization glasses or the shutter glasses may be appropriately selected depending on the aspects, the shutter glasses method is more suitably adopted in an aspect such as televisions for general household use where an unspecified number of viewers has to be assumed. The shutter method is suitably adopted in many aspects.

For example, the luminance balance between the right and the left is modifiable in the case where the transmittance of the glasses changes over time. Further, the method is also applicable to the case where the image display apparatus changes luminance balance between the right and the left according to average disparity of the contents. Meanwhile, the method of controlling the transmittance of polarization glasses does not use power for use of the glasses and the conditions of viewers are reliably specifiable, so that the method is suitably adopted in stable viewing environments.

[2] In each unit pixel group, the second pixel is adjacent to the first pixel. The image processing unit sets, for displaying three-dimensional images, the luminance of at least each one included in the first pixel in the entire unit pixel groups to be higher than the luminance of the entire second pixels of the entire unit pixel groups. The configuration allows for visual recognition of images with less uncomfortable feeling for those who see the screen without using glasses for viewing three-dimensional images.

Such setting is implemented by the image processing unit setting the luminance of at least each one included in the first pixel to be higher than the luminance of the entire second pixels in each unit pixel group.

In each unit pixel groups, to set the luminance of at least one included in the above first pixel higher than the luminance of the entire second pixels, the image display apparatus may execute processes A to E described in connection with the fourth embodiment.

[3] A plurality of first pixels exists in the unit pixel groups. The image processing unit performs luminance setting differently for the plurality of first pixels in the unit pixel groups. Further, the image processing unit subtracts, with respect to the pixels other than the pixel that is assigned the highest luminance in the first pixels, the luminance of the second pixel from the set luminance in the unit pixel groups. In the case where a negative value is given by the subtraction, the luminance of the pixels other than the pixels assigned with the highest luminance is set to "0".

<Variation>

(1) As described above, the image processing unit includes mapping processing unit 1324 for performing allocation of luminance to the first pixel and to the second pixel per unit pixel group. In the case where the first pixel is provided in larger number than the second pixel in the unit pixel unit group (see FIG. 16), mapping processing unit 1324 performs resolution conversion by a non-linear filter on the first image, so as to perform the allocation of luminance to the first pixel. The reason is provided below.

In the above embodiment, luminance components are used to perform image conversion. The luminance component has a lot to do with a sense of fineness of video. In addition, the number of the first pixel is larger than the number of the second pixel. For this reason, it is preferred to use a filter, such as an LNNCZOS filter or a bicubic, that is said to be better at maintaining a sense of fineness (better at maintaining edge information). According to the method, the information on the edge contour is retained while a sense of resolution is enhanced, and the allocation of luminance is achieved by using an image with a relatively smaller luminance component among interpolated images.

(2) The liquid crystal mode of the liquid crystal display of the image display apparatus is normally black vertical alignment.

In two-dimensional image display and three-dimensional image display, reduction in contrast may be a factor for occurrence of crosstalk. Hence, to obtain sufficient contrast, the liquid crystal mode of liquid crystal contained in the liquid crystal display is preferably a liquid crystal mode of normally black vertical alignment.

(3) The liquid crystal mode is a mode of combination of vertical alignment and alignment division. The alignment division means formation of a plurality of regions that are different in direction of alignment in one pixel.

In the case where an image displayed on the image display apparatus with naked eyes it is known that the luminance of pixels greatly fluctuate depending on the perspective field of view. Such fluctuation in luminance may impair the quality of images subjected to the above-described allocation of luminance. Thus, it is preferred that a technology for improving the perspective field of view be applied to a maximum extent to the above-described image display apparatus. Hence, it is preferred to incorporate a known technology for improving the perspective field of view, such as a scattering film, an IPS (In Plane Switching) liquid crystal, domain decomposition (MPD), to the image display apparatus.

(4) It is expected that the video processing units of the image display apparatuses of the embodiments are sold as display controlling devices. It is also expected that the displays and subsequent devices of the image display apparatuses are sold as display controlling apparatuses.

(5) The processing at the video processing units described in connection with the embodiments is implemented by hardware and software to be executed by CPUs. Such software may be stored in advance on a non-volatile memory. The software may also be distributed as a program product that is stored on a storage medium such as a DVD-ROM. Alternatively, the software may be provided as a downloadable program product by information providers connected over so-called the Internet. Such software is read from the storage medium by a reader such as a DVD-ROM driver, or alternatively, is downloaded by means of a communication IF, and then once stored on a non-volatile memory. The software is read from the non-volatile memory by the CPU and stored in the form of an executable program on a volatile memory such as a RAM. The CPU executes the program.

In recent years, instances is increasing in which an LSI having a program function such as a cell is used for image processing, and conceivable modes include a program to be executed by such a chip and an image processing board mounting an LSI that is configured to read and execute the program.

The exemplary recording medium is not limited to a DVD-ROM, a CD-ROM, an FD (Flexible Disk), or a hard disk, and may be a medium that carries a program in a stationary manner, such as a magnetic tape, a cassette tape, an optical disk (MO (Magnetic Optical Disc)/MD (Mini Disc)/DVD (Digital Versatile Disc)), and an IC (Integrated Circuit) card including a memory card, an optical card, or a semiconductor memory including a mask ROM, an EPROM (Electronically Programmable Read-Only Memory), an EEPROM (Electronically Erasable Programmable Read-Only Memory), or a flash ROM. The recording medium is a non-temporary medium of which, for example, the program thereon is computer-readable.

The program herein includes not only a program that is directly executable by the CPU but also a program in the form of a source program, a compressed program, and an encrypted program.

(6) For example, in the foregoing embodiments, modes are exemplified in which the left-eye image is principally visually recognized for the viewer who does not wear an optical aid, such as shutter glasses or polarization glasses. Contrarily, the configuration may be such that the right-eye image is principally visually recognized by the viewer who does not wear an optical aid, and similar effects are obtainable therefrom.

(7) In the foregoing embodiments, a configuration is exemplified in which disparity image generating unit 131 generates the left-eye image and right-eye image from the video signals inputted. However, the configuration may be such that the left-eye image and right-eye image are separated at an external device so as to be inputted in a separate manner.

(8) In, for example, the first embodiment, a configuration is exemplified in which mode selection is possible between a 3-D specific mode and a 2-D/3-D common mode, but the possibility of the mode selection is not essential in implementing the present invention. For example, an implementation may be a system that is operable in the operation mode referred to as the 2-D/3-D common mode in the above description.

(9) The above-described image display apparatuses 1, 1A, 1B, 1C, and 1D can be described such that the left-eye image and the right-eye image are displayed in a spatially overlapping manner, namely, two pictures are displayed so as to look like overlapping each other with the images to be displayed switched at a high speed or mixedly located by dot or line, not that the images are separated by half between the right and the left at the center of the screen, and that a dedicated optical aid acts to allow the right-hand image and the left-hand image to transmit therethrough selectively or to shield the images thereat, so as to project the images to the right and left fields of view of the user, respectively.

The embodiments disclosed herein are illustrative and are not limited to the foregoing description. It is intended that the scope of the present invention is defined by the appended claims and all changes and modifications are encompassed by the claims and within the meaning and scope of the equivalents thereof.

REFERENCE SIGNS LIST 1, 1A, 1B, 1C, 1D image display apparatus, 2 shutter glasses, 4, 4B polarization glasses, 11, 11A, 11B display unit, 12 shutter controlling unit, 13, 13A, 13B, 13C, 13D video processing unit, 16, 16B polarization filter layer, 16L, 16R linear polarization filter, 21L, 21R liquid crystal shutter, 23 control signal receiving unit, 41L, 41R linear polarization filter, 42L, 42R linear polarization filter, 50 video signal, 60 luminance ratio data, 61 mode switch data, 100, 100A, 100B, 100C, 100D three-dimensional image display system, 131 disparity image generating unit, 132, 132B, 132C, 132D image processing unit, 133 display data generating unit, 133A, 133B display data generating unit, 134, 134A liquid crystal controller, 1321 gamma correcting unit, 1322 luminance balance adjusting unit, 1323 size converting unit, 1324 mapping processing unit, 1325 inverse gamma correcting unit, 1326 right luminance regulating unit, 1327 crosstalk correcting unit, Urn, Un unit pixel group.

The invention claimed is:

1. A three-dimensional image display apparatus, including a plurality of pixels, displaying on a screen a left-eye image and a right-eye image constituting one three-dimensional image in one frame period,
said pixels belonging to any of a plurality of pixel groups,
said plurality of pixel groups each including a first pixel and a second pixel as said pixels,
said three-dimensional image display apparatus, comprising:
a polarizer for polarizing light to be emitted from said first pixel into light with a first polarization characteristic and for polarizing light to be emitted from said second pixel into light with a second polarization characteristic, depending on a voltage supplied by a voltage supply and a respective signal;
an imager for setting luminance of at least one of luminance of said left-eye image or luminance of said right-eye image, such that the luminance of a predefined first image of said left-eye image or said right-eye image is higher than the luminance of a second image of the images; and
a display controller for causing said first pixel to render said first image at said set luminance on said screen and for causing said second pixel to render said second image at said set luminance on said screen, wherein
in each of said pixel groups, said second pixel is adjacent to said first pixel,
said imager, when displaying each three-dimensional image, luminance of at least one of said first pixels in all the pixel groups is set to be higher than luminances of all the second pixels in all the pixel groups, wherein
said first pixel comprises a plurality of pixels in each of said pixel groups, and
said imager sets different luminance values for said plurality of first pixels in each of said pixel groups, and subtracts luminance of said second pixel from said set luminance with respect to pixels other than a pixel with the highest luminance of said plurality of first pixels in said each of said pixel groups, wherein
said second pixel is adjacent to said first pixel group in each of said pixel groups,
said first pixel is larger in number than said second pixel in each of said pixel groups, and said imager allocates luminance to said first pixel and said second pixel in each of said pixel groups, and performs resolution conversion by using a non-linear filter on said first image, to conduct said allocation of luminance to said first pixel.

2. The three-dimensional image display apparatus according to claim 1, wherein luminance of at least one included in said first pixels is adapted to be set higher than luminances of said all the second pixels in said pixel group.

3. The three-dimensional image display apparatus according to claim 1, wherein
said three-dimensional image display apparatus is a liquid crystal display, and
said liquid crystal display has a liquid crystal mode of normally black vertical alignment.

4. The three-dimensional image display apparatus according to claim 3, wherein said liquid crystal mode is a mode of combination of said vertical alignment and alignment division.

5. The three-dimensional image display apparatus according to claim 1, wherein said imager sets the luminance of said first image to be greater than or equal to double and less than or equal to eight times the luminance of said second image for display of said three-dimensional image.

6. A method of driving a three-dimensional image display apparatus displaying on a screen a left-eye image and a right-eye image constituting one three-dimensional image within one frame period,
said three-dimensional image display apparatus including a plurality of pixels,
said pixels belonging to any of a plurality of pixel groups,
said plurality of pixel groups each including a first pixel and a second pixel as said pixels,
said three-dimensional image display apparatus further including a polarizer for polarizing light to be emitted from said first pixel into light with a first polarization characteristic and for polarizing light to be emitted from said second pixel into light with a second polarization characteristic, depending on a voltage supplied by a voltage supply and respective signal,
said driving method comprising:
setting, by a processor of said three-dimensional image display apparatus, luminance of at least one of luminance of said left-eye image or luminance of said right-eye image such that the luminance of a predefined first image of said left-eye image or said right-eye image is higher than the luminance of a second image of said images; and
causing, by said processor, said first pixel to render said first image at said set luminance on said screen and causing said second pixel to render said second image at said set luminance on said screen, wherein,
in each of said pixel groups, said second pixel is adjacent to said first pixel,
when displaying each three-dimensional image, setting luminance of at least one of said first pixels in all the pixel groups to be higher than luminances of all the second pixels in all the pixel groups, wherein
said first pixel comprises a plurality of pixels in each of said pixel groups, and
setting different luminance values for said plurality of first pixels in each of said pixel groups, and subtracting luminance of said second pixel from said set luminance with respect to pixels other than a pixel with the highest luminance of said plurality of first pixels in said each of said pixel groups, wherein
said second pixel is adjacent to said first pixel group in each of said pixel groups,
said first pixel is larger in number than said second pixel in each of said pixel groups, and
allocating luminance to said first pixel and said second pixel in each of said pixel groups, and performing resolution conversion by using a non-linear filter on said first image, to conduct said allocation of luminance to said first pixel.

7. A non-transitory computer-readable recording medium storing a program for controlling a three-dimensional image display apparatus, including a plurality of pixels, and displaying on a screen a left-eye image and a right-eye image constituting one three-dimensional image within one frame period,
said pixels belonging to any of a plurality of pixel groups,
said plurality of pixel groups each including a first pixel and a second pixel as said pixels,
said program causing said three-dimensional image display apparatus to execute:
setting luminance of at least one of luminance of said left-eye image or luminance of said right-eye image such that the luminance of a predefined first image of said left-eye image or said right-eye image is higher than the luminance of a second image of the images; and
causing said first pixel to render said first image at said set luminance on said screen and causing said second pixel to render said second image at said set luminance on said screen, wherein,
in each of said pixel groups, said second pixel is adjacent to said first pixel,
when displaying each three-dimensional image, setting luminance of at least one of said first pixels in all the pixel groups to be higher than luminances of all the second pixels in all the pixel groups, wherein
said first pixel comprises a plurality of pixels in each of said pixel groups, and
setting different luminance values for said plurality of first pixels in each of said pixel groups, and subtracting luminance of said second pixel from said set luminance with respect to pixels other than a pixel with the highest luminance of said plurality of first pixels in said each of said pixel groups, wherein
said second pixel is adjacent to said first pixel group in each of said pixel groups,
said first pixel is larger in number than said second pixel in each of said pixel groups, and
allocating luminance to said first pixel and said second pixel in each of said pixel groups, and performing resolution conversion by using a non-linear filter on said first image, to conduct said allocation of luminance to said first pixel.

* * * * *